United States Patent
Juncker et al.

(10) Patent No.: US 9,822,890 B2
(45) Date of Patent: Nov. 21, 2017

(54) METHOD AND SYSTEM FOR PRE-PROGRAMMED SELF-POWER MICROFLUIDIC CIRCUITS

(75) Inventors: David Juncker, Verdun (CA); Hosseinali Safavieh, Montreal (CA)

(73) Assignee: THE ROYAL INSTITUTION FOR THE ADVANCEMENT OF LEARNING/MCGILL UNIVERSITY, Montreal (CA)

( * ) Notice: Subject to any disclaimer, the term of this patent is extended or adjusted under 35 U.S.C. 154(b) by 483 days.

(21) Appl. No.: 14/241,930

(22) PCT Filed: Aug. 30, 2012

(86) PCT No.: PCT/CA2012/000805
§ 371 (c)(1),
(2), (4) Date: Jun. 30, 2014

(87) PCT Pub. No.: WO2013/029159
PCT Pub. Date: Mar. 7, 2013

(65) Prior Publication Data
US 2014/0332098 A1    Nov. 13, 2014

Related U.S. Application Data

(60) Provisional application No. 61/528,853, filed on Aug. 30, 2011.

(51) Int. Cl.
*F15C 1/00* (2006.01)
*F16K 15/18* (2006.01)
*B01L 3/00* (2006.01)

(52) U.S. Cl.
CPC .......... *F16K 15/18* (2013.01); *B01L 3/50273* (2013.01); *B01L 3/502738* (2013.01);
(Continued)

(58) Field of Classification Search
CPC .......... B01L 3/5027; B01L 2200/0621; B01L 2300/04; B01L 2300/087; F16K 2099/0084
(Continued)

(56) References Cited

U.S. PATENT DOCUMENTS 4,426,451 A * 1/1984 Columbus ......... B01L 3/502738
138/44
4,963,498 A * 10/1990 Hillman ................ B01F 5/0646
356/28

(Continued)

FOREIGN PATENT DOCUMENTS

| EP | 1304167 | 7/2004 |
| EP | 1441131 | 7/2004 |

(Continued)

OTHER PUBLICATIONS

Extended European Search Report issued in EP 12826963.6, dated Sep. 2, 2015.

*Primary Examiner* — Minh Le
(74) *Attorney, Agent, or Firm* — Norton Rose Fulbright Canada LLP

(57) ABSTRACT

A major challenge for the general use of "lab-on-a-chip" (LOAC) systems and point-of-care (POC) devices has been the generally complex and need for sophisticated peripheral equipment, such that it is more difficult than anticipated to implement low cost, robust and portable LOAC/POC solutions. It would be beneficial for chemical, medical, healthcare, and environmental applications to provide designs for inexpensive LOAC/POC solutions compatible with miniaturization and mass production, and are potentially portable, using compact possibly hand-held instruments, using reusable or disposable detectors. Embodiments of the invention address improved circuit elements for self-powered self-regulating microfluidic circuits including programmable (Continued)

retention valves, programmable trigger valves, enhanced capillary pumps, and flow resonators. Additionally embodiments of the invention allow for the flow direction within a microfluidic circuit to be reversed as well as for retention of reagents prior to sale or deployment of the microfluidic circuit for eased user use.

21 Claims, 25 Drawing Sheets

(52) U.S. Cl.
CPC . *B01L 3/502746* (2013.01); *B01L 2200/0621* (2013.01); *B01L 2200/16* (2013.01); *B01L 2300/044* (2013.01); *B01L 2300/048* (2013.01); *B01L 2300/087* (2013.01); *B01L 2300/0816* (2013.01); *B01L 2300/0867* (2013.01); *B01L 2300/0883* (2013.01); *B01L 2300/0887* (2013.01); *B01L 2400/0406* (2013.01); *B01L 2400/0688* (2013.01); *B01L 2400/0694* (2013.01); *B01L 2400/086* (2013.01); *Y10T 137/7837* (2015.04)

(58) Field of Classification Search
USPC .................................................. 137/825, 806
See application file for complete search history.

(56) References Cited

U.S. PATENT DOCUMENTS

| | | | | |
|---|---|---|---|---|
| 5,223,219 A | * | 6/1993 | Subramanian | B01L 3/5027 210/451 |
| 6,084,660 A | * | 7/2000 | Shartle | G01N 33/4905 356/246 |
| 6,090,251 A | * | 7/2000 | Sundberg | B01J 19/0093 204/450 |
| 6,426,230 B1 | * | 7/2002 | Feistel | B01L 3/50273 422/430 |
| 6,432,695 B1 | * | 8/2002 | Zou | B01L 3/5027 216/2 |
| 6,591,852 B1 | * | 7/2003 | McNeely | B01F 5/0403 137/14 |
| 7,316,802 B2 | * | 1/2008 | Blankenstein | B01L 3/50273 422/520 |
| 8,592,221 B2 | * | 11/2013 | Fraden | B01L 3/502746 137/14 |
| 2002/0036018 A1 | | 3/2002 | McNeely et al. | |
| 2003/0022362 A1 | * | 1/2003 | Kirk | B01L 3/5025 435/288.4 |
| 2004/0206408 A1 | * | 10/2004 | Peters | B01L 3/502738 137/825 |
| 2005/0249641 A1 | | 11/2005 | Blankenstein et al. | |
| 2006/0000709 A1 | * | 1/2006 | Bohm | B01L 3/502738 204/403.01 |
| 2008/0130402 A1 | * | 6/2008 | Karaki | B01F 13/0059 366/142 |
| 2010/0294811 A1 | * | 11/2010 | Akechi | B01L 3/5027 422/521 |
| 2014/0130877 A1 | * | 5/2014 | Ono | B01L 3/502738 137/1 |
| 2014/0332098 A1 | * | 11/2014 | Juncker | B01L 3/50273 137/511 |

FOREIGN PATENT DOCUMENTS

| | | | |
|---|---|---|---|
| EP | 1946830 | 7/2008 | |
| EP | 1992402 | 11/2008 | |
| WO | 2008083687 | 7/2008 | |
| WO | WO2008/130623 | * 10/2008 | ................ B01L 3/00 |

* cited by examiner

Figure 2B
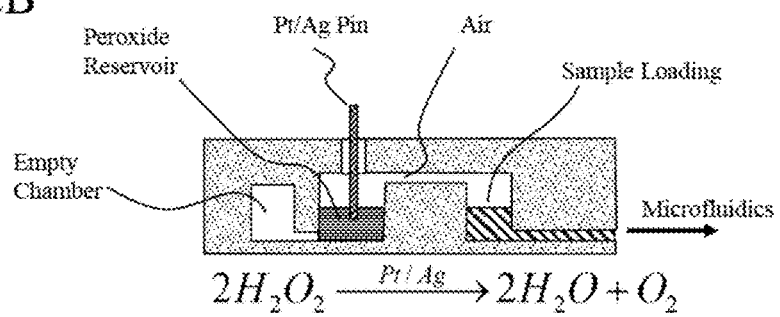
Figure 2C
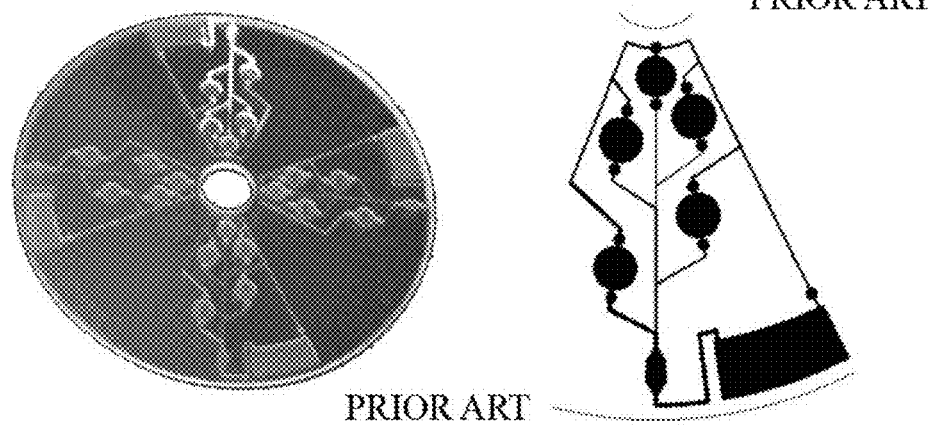
PRIOR ART
PRIOR ART
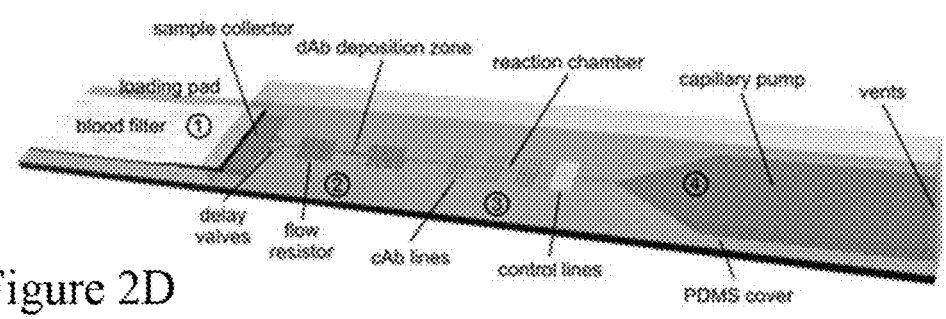
Figure 2D
PRIOR ART

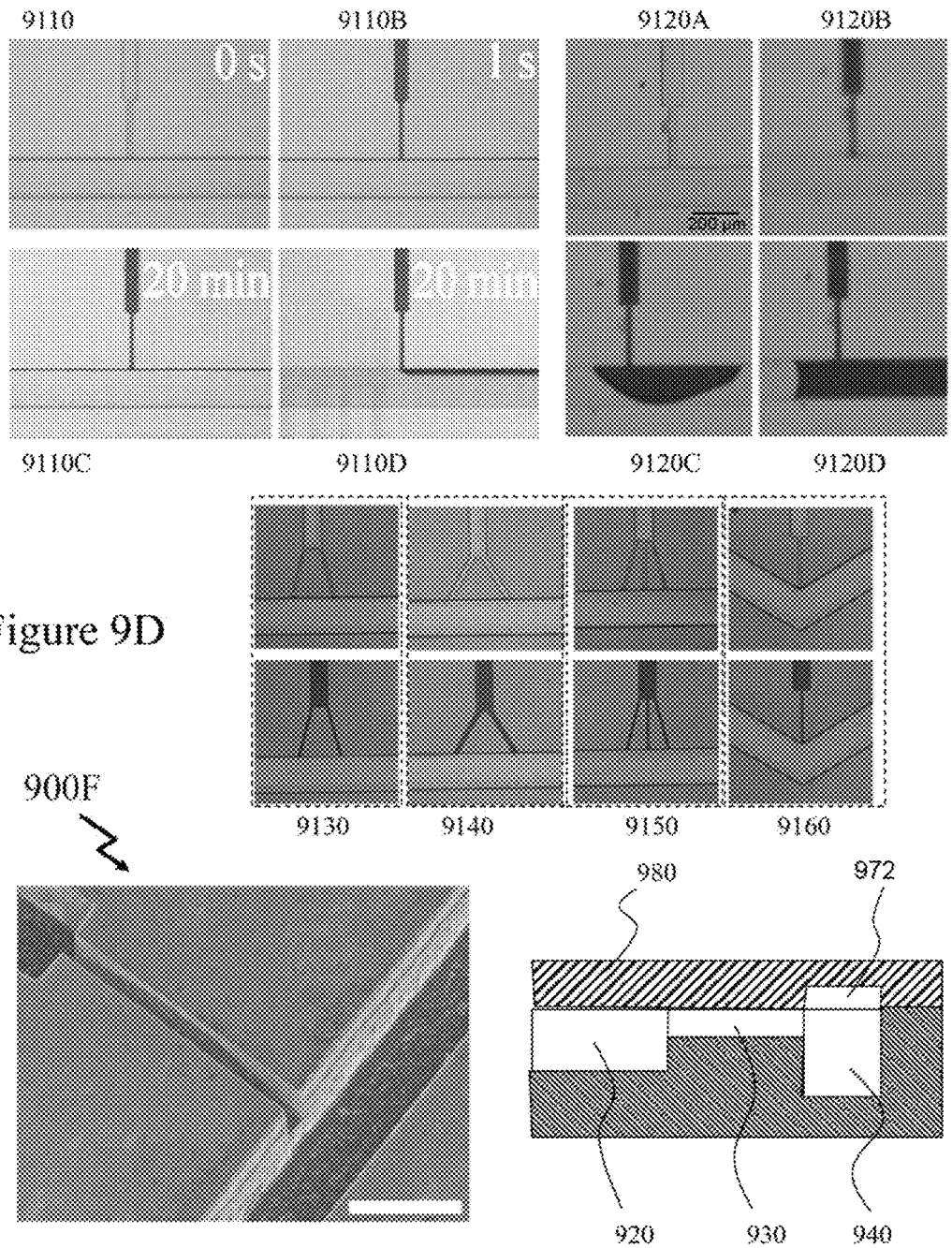

METHOD AND SYSTEM FOR PRE-PROGRAMMED SELF-POWER MICROFLUIDIC CIRCUITS

CROSS-REFERENCE TO RELATED APPLICATIONS

This patent application claims the benefit of U.S. Provisional Patent Application U.S. 61/528,853 filed Aug. 30, 2011 entitled "Microfluidic System using Capillary Effects."

FIELD OF THE INVENTION

The present invention relates to microfluidic systems and more particularly to pre-programmed self-powered microfluidic systems employing capillary elements.

BACKGROUND OF THE INVENTION

Biological assays (commonly referred to as bioassays) are a type of scientific experiment. Bioassays are typically conducted to measure the effects of a substance on a living organism and exploit in many instances the concentration, purity or biological activity of a substance such as vitamin, hormone, and plant growth factor. While measuring the effect on an organism, tissue cells, enzymes or receptor bioassays may also process and/or compare a standard preparation, i.e. a reference. Bioassays may be qualitative or quantitative and are typically employed in healthcare, environmental analysis, and emergency/threat type applications.

Healthcare: where bioassays may provide personalised access for individuals, relatives, carers and other specialists to real-time or historical information generated by wearable sensors, implantable devices or home based diagnostics units facilitates home or community based healthcare as well as improving diagnosis and patient data acquisition for hospital-centric treatments. Further, access to low cost communications and diagnostics also provides a means to rapidly improve the delivery of healthcare in less well-developed regions and remote regions.

Environment: where bioassays may provide multi-chemical sensors monitoring air and water quality can provide early warning of pollution events arising at industrial plants, landfill sites, reservoirs, and water distribution systems at remote locations for example. Increased analytics and wider/denser sensor networks may provide enhanced detection/categorization of events as they happen, and organizing/prioritizing the response(s).

Emergency/Disaster and Threat Detection: wherein bioassays may provide multi-measurand analytics and wider/denser/faster/immediate analytics against chemical, biological or radiological threats. Bioassays may therefore adjust chemical and biological measurements which today are overwhelmingly post-event and primarily related to gathering remedial and forensic information.

Microbiological testing, for example, demonstrates how microfluidics may provide benefit in one respect wherein traditionally, the plating and culturing to determine cells counts of bacteria requires multiple biochemical and serological characterization steps typically requiring days to weeks and hence unsuitable for many applications. Accordingly, developments of alternatives including emerging technologies such as enzyme linked immunosorbent assay (ELISA), polymerase chain reaction (PCR), DNA and flow cytometry have been geared to increasing speed of detection and reducing the volume of sample required. Pathogen detection utilizing ELISA has also become well established.

However, integrated microfluidic systems (also referred to as "lab-on-a-chip") offer improvements in the mass transport of the bacteria to the sensors and reductions in detection time to below 30 minutes.

To date a major challenge for the clinical use of "lab-on-a-chip" (LOAC) systems has been that they are generally complex and require sophisticated peripheral equipment, and as a result have proven much more difficult than anticipated to implement as low cost, robust and portable point-of-care systems. Whilst less integrated solutions have also been developed these are generally categorized as biosensors. Biosensors basically incorporate biological recognition elements (probes) such as antibodies, nucleic acids, and other types of receptors which provide a specific affinity toward a target analyte, and a transducer that converts the ensuing recognition event and biochemical activity into a measurable signal (commonly optical or electrical in nature). A wide range of biosensors has been developed for selective bacteria detection. However, most of these sensors rely on antibodies for capturing the bacteria on the surface, but antibodies are not efficient at capturing bacteria (bacteria are enormous compared to small molecules against which antibodies are commonly used), In addition, to date only a few biosensors may be integrated into LOAC systems in order to allow them to produce inexpensive LOAC systems which are easily amenable to miniaturization and mass production, and are potentially portable, using compact possibly hand-held instruments, using reusable or disposable detectors.

Another class of sensors that has progressed tremendously over the last few years are circulating tumor cell sensors. Circulating tumor cells (CTCs) are shed by tumors into the blood and are key to metastasis and an important prognostic for cancer progression. However, the isolation of CTCs is extremely challenging as they are significant even at ultralow concentrations of 5 cells per milliliter and the difficulty of separating them from white blood cells that are of similar size but present at concentrations of several million times higher, approximately $10^7$ cells per milliliter. Further, CTCs must be selected against a background of immune cells that are similarly a million times more concentrated. Such imbalances in biological material to be detected versus the background biological environment match or exceed those with bacteria such as methicillin-resistant *staphylococcus aureus* (MRSA) which is a bacterium responsible for several difficult-to-treat infections in humans.

Microfluidics provided a breakthrough in CTC cell isolation, see for example Nagrath et at in "Isolation of Rare Circulating Tumour Cells in Cancer Patients by Microchip Technology" (Nature, 2007, pp. 1235-1239), Adams et al in "Highly Efficient Circulating Tumor Cell Isolation from Whole Blood and Label-Free Enumeration Using Polymer-Based Microfluidics with an Integrated Conductivity Sensor" (J Am. Chem. Soc., Vol. 130(27), pp 8633-8641), and S. Stott et at in "Isolation of Circulating Tumor Cells using a Microvortex-Generating Herringbone-Chip" (Proc. Nat. Acad. Sci., Vol. 107(43), pp 18392-18397). However, a drawback of these type of microfluidic technologies developed to date was that their low flow rate typically resulted in isolation times of several hours. In contrast D. Juneker in U.S. Patent Application 2012/0,617,714 entitled "Methods and Devices for Multi-Dimensional Separation, Isolation and Characterization of Circulating Tumour Cells," the entire contents of which are included by reference, overcomes this drawback with a large conduit based sequential filtering platform which can be adapted to microfluidic based LOAC systems such as described below in respect of embodiments of the invention.

Referring to FIG. 1A the operating principle of microfluidics is outlined. For a liquid on a surface the surface tensions of the liquid, $\gamma_{SL}$, $\gamma_{LG}$, $\gamma_{GS}$ being the solid-liquid, liquid-gas, and gas-solid defines a contact angle $\theta_C$ as given by Equation (1A) below. Re-arranging Equation (1A) yields Equation (1B) that defines the contact angle as a function of the surface tensions of the liquid, $\gamma_{SL}$, $\gamma_{LG}$, and $\gamma_{GS}$ respectively. When $90°<\theta<180°$ the liquid is non-wetting on the surface and when $0°<\theta<90°$ the liquid wets the solid surface. When $\theta=0°$ a special condition known as wetting out is achieved, which implies $\gamma_{SG}=\gamma_{SL}$. Accordingly wetting of a liquid can be promoted by a variety of techniques including, but not limited to, roughening the surface (if $\theta_C<90°$), reducing surface tension through addition of a surfactant to the liquid, putting an adsorbate material on the solid, and chemically modifying the solid surface (e.g. plasma treatment). Poly(dimethylsiloxane) (PDMS) which is one of several types of silicones employed in a variety of medical devices as well as contact lenses has $\theta_{water} \approx 105°$ in its untreated form such that water does not wet. However, immediately after plasma treatment of PDMS $\theta_C=0°$.

The Young-Laplace equation, see Equation (2), describes the capillary pressure, $P_C$, across the interface between two static fluids due to the phenomenon of surface tension and states that this pressure difference is proportional to the surface tension, $\gamma$, and inversely proportional to the effective radius, r, of the interface and also depends on the wetting angle, $\theta$, of the liquid on the surface of the capillary as given by Equation (2A) below. As evident in FIG. 1B the situation for a film is more complicated as a liquid film of dimensions L, w, and d in the x, y, and z dimensions respectively with exhibit a first radius $r_1$ in the y direction and $r_2$ in the x direction. Solving the various equations yields Equation (2B) wherein it is evident that the pressure differential, $\Delta P_C$, can therefore be adjusted through variations in the dimensions of the microfluidic channel within which the fluid is constrained, where $\theta_{b,t,l,r}$ are the contact angles of the liquid with the bottom, top, left and right walls of a microfluidic channel respectively.

$$\gamma_{SL} - \gamma_{SG} - \gamma_{LG}\cos\theta_C = 0 \quad (1A)$$

$$\cos\theta_C = \frac{\gamma_{SG} - \gamma_{SL}}{\gamma_{LG}} \quad (1B)$$

$$P_C = \frac{2\gamma\cos\theta}{r} \quad (2A)$$

$$\Delta P_C = -\gamma\left(\frac{\cos\theta_b - \cos\theta_t}{d} + \frac{\cos\theta_l - \cos\theta_r}{w}\right). \quad (2B)$$

To date multiple microfluidic systems have been developed targeting so called "point-of-care" (POC) analysis but with very few exceptions these have to date relied upon complex peripherals for system operation, and sometimes for assay readout as well. This has limited their adoption within clinics to date as well as preventing their deployment in more consumer driven POC analysis outside clinics without medical supervision integrating with online electronic health records, see for example Steinbrook in "Personally Controlled Online Health Data—The Next Big Thing in Medical Care" (New England J. Med., 2008, pp. 1653-1656).

FIG. 2A depicts an example of a conceptual microfluidic POC device after Gervais et al in "Microfluidic Chips for Point-of-Care Immunodiagnostics" (Advanced Materials, Vol. 23(24), pp. H151-H176, hereinafter Gervais1) wherein a POC tester comprising a body 210A and cover 210B allows a user to perform a measurement or measurements based upon the provisioning of a sample and its initial processing in sample processor 220A. Sample processor 220A for example performing cell separation, cell pre-treatment, pre-concentration or amplification prior to the sample entering a microfluidic chip 220B which is optically interrogated with optical head 220C coupled to opto-electronic circuit 220D. The optical signal is then processed by signal processing electronics 220E which may for example include signal processing, signal encryption, wireless interface, wired interface and logic. The results are presented to the user on display 220F. The body 210A of the POC tester may also include ancillary electronics 220G, such as power supply, USB connector and antenna for example.

Of the many microfluidic systems developed for POC analysis electrokinetically driven microfluidics have existed since the mid-1990 s, see for example "Electrokinetics in Microfluidics, Volume 2 (Interface Science and Technology)" (Elsevier, ISBN-13: 978-0120884445), and whilst powerful require high voltages making for complex systems to operate them. Similarly pneumatically actuated systems have been demonstrated, see for example Braschler et al in "A simple Pneumatic Setup for Driving Microfluidics" (Lab on a Chip, Vol. 7, pp. 420-422), but necessitate large valves. Referring to FIG. 2B there is depicted a chemical reaction driven microfluidic element according to the prior art of Qin et al in "Self-Powered Microfluidic Chips for Multiplexed Protein Assays from Whole Blood" (Lab on a Chip, Vol. 9(14), pp. 2016-2020). Accordingly, a sample is loaded into a chamber within the microfluidic assembly is driven by pressure arising from the generation of oxygen within the microfluidic assembly as a result of a Pt/Ag catalytic breakdown of hydrogen peroxide into water and oxygen which then drives the sample through the microfluidic channels.

Centrifugally driven microfluidics, so called "Lab-on-a-CD" have become popular but require tailor-made spinning systems that have now be made into convenient systems, but are not widely used. Such a Lab-on-a-CD is depicted in FIG. 2C for a five-step flow sequencing CNC-machined CD after Lai et al in "Design of a Compact Disk-like Microfluidic Platform for Enzyme-Linked Immunosorbent Assay" (Anal. Chem., Vol. 76, pp. 1832-1837). Accordingly, capillary microfluidics constitute the most successful technology to date for assays, and indeed are commercially extremely successful for example in providing the lateral flow strips for pregnancy tests, and more recently emergency care for cardiac disease through analysis of a panel of proteins. Such a capillary microfluidic device for immunoassay being depicted in FIG. 2D according to Gervais et al in "Toward One-Step Point-of-Care Immunodiagnostics using Capillary-Driven Microfluidics and PDMS Substrates" (Lab on a Chip, Vol. 9, pp. 3330-3337, hereinafter Gervais2). As depicted a series of functional microfluidic elements are implemented onto the chip for performing immunoassays where the position of and interaction between the analyte, detection antibodies (dAbs) and capture antibodies (cAbs) are illustrated along different parts of the chip where the microfluidic circuit is patterned with lines of cAbs and antigens for the control lines. The silicon circuit has the loading pad, the sample collector, the delay lines, the dAb deposition zones with dAbs, the reaction chamber, the capillary pumps and the vents.

Unlike other microfluidic solutions those based upon microfluidic capillary systems are powered by capillary effects and the control of fluid flow is structurally and chemically encoded into the microscale conduits, the capillaries. According, such capillary systems can be designed to be entirely self-powered and self-regulated, making them very useful for POC applications. Within the prior art an initial library of capillary elements have been reported used for capillary systems including:

microchannels which are closed channels employing hydrophilic or plasma treated conduit surfaces;

serpentine flow resistors which regulate flow rate over a desired region;

delay lines which are typically binary hierarchy microchannels combining flows from a sample collector for example;

vents which are openings within the microfluidic circuit connected to air allowing air to be vented from a closed channel as a fluid fills part of the closed channel;

capillary pumps which are microstructured reservoirs, typically with hydrophilic posts, to generate capillary pressure over a desired region without a significant resistance;

capillary retention valves (CRVs) wherein localized channel cross-section reduction creates a high capillary pressure thereby pinning the fluid after a capillary has been drained; and capillary trigger valves (CTVs) which are formed as a channel intersects (crosses) a main channel wherein the fluid in the cross-channel is retained for a period of time until its release is triggered by another fluid in the main channel.

Accordingly, using these elements, capillary systems for filling and draining of one sample at a time can be made, but more complex fluidic operations cannot be achieved with these alone, see for example Juncker et al in "Autonomous Microfluidic Capillary System" (Anal. Chem., Vol. 74, pp. 6139-6144) and Gervais2.

Capillary trigger valves (CTVs), also known as fluidic trigger values, have been proposed by J. Melin et at in "A Liquid-Triggered Liquid Microvalve for On-Chip Flow Control" (12$^{th}$ Int. Conf. Solid State Sensors, Actuators, and Microsystems, 2003, pp. 1562-1565) and Delamarche et al in "Microfluidic Networks for Chemical Patterning of Substrates: Design and Applications to Bioassays" (J. Am. Chem. Soc., Vol. 120, pp. 500-508). However, these are based on high aspect ratios, up to 10 in some cases, of microfluidic channel depth/width and manufactured using deep reactive ion etching (RIE) in silicon (Si). However, such valves are not amenable to fabrication using low cost replica molding techniques that are typically limited to aspect ratios of 2-3. In addition, these valves were prone to leakage owing to flow along the edges at the bottom of the microfluidic channel or have limited retention times. Accordingly it would be beneficial to implement CTVs with low aspect ratio valve that can readily be made using low cost replication techniques, that are robust, do not leak, and have long leadtimes.

Capillary retention valves (CRVs) based upon capillary forces preventing the drainage of fluid have been achieved to date through small cross-section capillary geometries that generates a high capillary pressure (force), see for example Juncker. Initial CRVs were stronger than the capillary pump such that the liquid was retained indefinitely. Whilst developments on CRVs resulted in variable definable retention capacity the retention capacity was not well differentiated and accordingly sometimes CRVs with smaller cross-sections drained before larger cross-sections. Accordingly, it would be beneficial to provide CRVs with reliable retention and release sequence.

The volumes of liquids flushed through capillary systems of microfluidic systems are defined by the geometry of the microfluidic conduits. However, for capillary pumps that are very wide, air bubbles are readily trapped within the capillary pumps because the liquid often proceeds more rapidly along edges, thereby encapsulating a bubble. Zimmerman et at in "Capillary Pumps for Autonomous Capillary Systems" (Lab on a Chip, Vol. 7(1), pp. 119-125, hereinafter Zimmerman1) established a ring based enlargement gradually expanding the lateral dimension of the capillary pump and centering one microstructure in the connecting channel at the entrance of the capillary pump to overcome this. However, filling factors of only approximately 60% to 75% were achieved thereby requiring significantly larger capillary pumps be fabricated to absorb the fluids within the microfluidic circuit. Accordingly it would be beneficial to implement capillary pumps that have increased absorption and avoid the issues of air bubbles.

Further, within prior art microfluidics, such as depicted for example in FIG. 2D the flow within the microfluidic system is one directional. It would be beneficial within some microfluidic systems to not only allow for the autonomous and sequential flow of multiple chemicals at various flow rates but also to provide for flow reversal.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to address limitations in the prior art relating to microfluidic systems and more particularly to pre-programmed self-powered microfluidic systems employing capillary elements.

In accordance with an embodiment of the invention there is provided a device comprising:

a first microfluidic channel having a first predetermined width, a first predetermined depth and at least a sidewall;

a second microfluidic channel having a second predetermined width and a second predetermined depth, the second microfluidic channel disposed with a first end at a first predetermined offset from the first microfluidic channel and having an axis orientated at a first predetermined angle relative to the sidewall of the first microfluidic channel;

a third microfluidic channel having a third predetermined width less than that of the second predetermined width and a third predetermined depth less than that of the second predetermined depth, the third microfluidic device disposed between the first end of the second microfluidic channel and the sidewall of the first microfluidic channel and having an axis orientated at a second predetermined angle relative to an axis of the first microfluidic channel; wherein a first fluid introduced into the second microfluidic channel will fill the second and third microfluidic channels but does not flow into the first microfluidic channel until a second fluid is present within the first microfluidic channel.

In accordance with an embodiment of the invention there is provided a device comprising:

a first microfluidic channel having a first predetermined width, a first predetermined depth, a first end coupled to a first predetermined portion of a microfluidic circuit, and a second distal end coupled to a first end of a third microfluidic channel;

a second microfluidic channel having a second predetermined width over a predetermined section of the second microfluidic channel, a second predetermined depth, a first end coupled to a second end of the third microfluidic channel, and a second distal end coupled to a second predetermined portion of the microfluidic circuit;

the third microfluidic channel having a third predetermined width less than that of the first predetermined width, a third predetermined depth, and disposed between the first and second microfluidic channels; wherein the dimensions of the second microfluidic channel are selected to establish a predetermined retention pressure for the combination of first, second, and third microfluidic channels such that a fluid coupled into the first microfluidic channel is coupled to the second and third microfluidic channels and is retained until the pressure within the first microfluidic channel arising from the first predetermined portion of a microfluidic circuit exceeds the predetermined retention pressure and the fluid is drained from the first, second, and third microfluidic channels without being pinned within the third microfluidic channel.

In accordance with an embodiment of the invention there is provided a device comprising:

an inlet coupled to a first corner of a first predetermined region of a microfluidic element;

an outlet coupled to a second corner of the first predetermined region of the microfluidic element;

the first predetermined region formed within a microfluidic element comprising a recess having a first predetermined depth and comprising a plurality of posts disposed in a plurality of rows of first predetermined spacing between adjacent rows, second predetermined spacing between adjacent posts within a row, and having a first predetermined angle with respect to an axis of the inlet, each post of the plurality of posts having predetermined dimensions such that a first channel of first predetermined width is formed between adjacent posts within a row and a second channel of second predetermined width is formed between adjacent rows.

In accordance with another embodiment of the invention there is provided a device comprising:

a trigger valve, the trigger valve coupling between a first microfluidic channel and a second microfluidic channel and retaining a first fluid within the first microfluidic channel after the trigger valve until a second fluid fills the second microfluidic channel;

a capillary pump coupled to the second microfluidic channel causing the second fluid to trigger the trigger valve linking the first and second microfluidic channels and reversing the flow of the first fluid within the first microfluidic channel such that the first fluid within the first microfluidic channel after the trigger valve now flows back to the trigger valve and into the second microfluidic channel.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 9D depicts video frame images of capillary trigger valves according to the prior art and an embodiment of the invention;

DETAILED DESCRIPTION

Figure 1A:
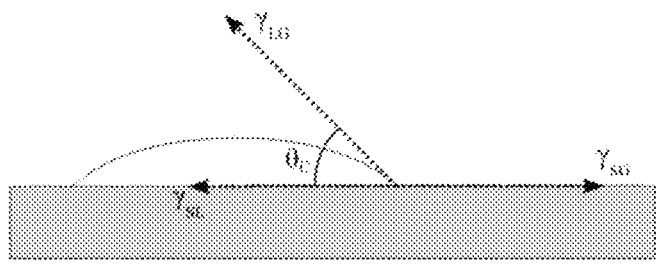
FIGS. 1A and 1B depict aspects of the principles behind microfluidic devices.
Figure 1B:
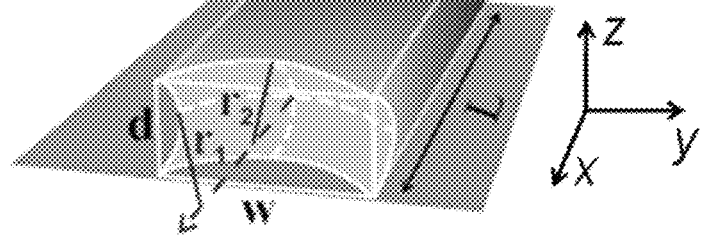

The present invention is directed to microfluidic systems and more particularly to pre-programmed self-powered microfluidic systems employing capillary elements.

The ensuing description provides exemplary embodiment(s) only, and is not intended to limit the scope, applicability or configuration of the disclosure. Rather, the ensuing description of the exemplary embodiment(s) will provide those skilled in the art with an enabling description for implementing an exemplary embodiment. It being understood that various changes may be made in the function and arrangement of elements without departing from the spirit and scope as set forth in the appended claims.

{AMEND FOR STANDARD TERMS IN SPECIFICATION} A "microfluidic circuit" (MICFLIC) as used herein and throughout this disclosure, refers to a capillary action based circuit employing microfluidic capillary structures which is self-powered and self-regulating through the designed performance of the microfluidic elements implemented within the microfluidic circuit.

A "point-of-care" (POC) device as used herein and throughout this disclosure refers to a testing device employing a MICFLIC to analyse one or more characteristics of a fluid sample. The POC device may be used for applications including, but not limited to, chemical, biological, environmental, and medical with or without subsequent result communication to the user of the POC device or a remote resource seeking the result. Such POC devices may be powered only by capillary action but may also include devices with local independent power, e.g. solar or battery, as well as those requiring connection to a local power supply.

Pre-Programmed, Self-Powered Autonomous Microfluidic Circuits within POC devices for detecting and/or serotyping as well as other analytics, need to be highly sensitive, specific, low cost, and compatible with simple non-clinical or non-technical operation if they are successfully translate from benches in analysis laboratories with trained technicians to bedsides, battlefields, chemical plants, doctors offices, and other environments without trained personnel. The microfluidic circuits (MICFLICs) described below with respect to embodiments of the invention address these problems by exploiting capillary flow technology which overcomes the needs for additional peripheral devices and provide techniques and solutions that are compatible with low cost, rapid mass fabrication methods. Such MICFLICs may provide discrete or multiple functions for POCs and generalized clinical environments including, but not limited to, sample analysis for diagnosis, DNA based biosensors, protein based biosensors, cell based biosensors, sample preparation (such as for laser scanning cytometry for example), sample preservation, and sample purification (such as exploiting immunoaffinity for example). Accordingly, whilst discussions and examples outlined within this specification are identified with certain specific POC devices and/or MICFLIC solutions it would be evident that the techniques, protocols, design rules, MICFLELs etc presented may be used in other MICFLICs without departing from the scope of the invention. Further, it would be evident that in some instances MICFLICs may be used in conjunction with non-microfluidic processing steps off-chip such as for example acid treatment and centrifuging in immunoaffinity based purification, for example, whilst antigen based capture and detection antibody labeling may be performed on-chip. In other embodiments of the invention such MICFLICs may be designed for automated insertion into other processing and analytic equipment thereby further reducing the handling and processing required by technicians.

Such MICFLICs may also by the appropriate design be self-powered such that introduction of a fluid specimen to be analysed to a loading (filling) port on the MICFLIC results in the subsequent steps of sample movement, reagent addition, incubation, filtering, washing, detection etc run in the desired sequence with the desire time—flow characteristics. The MICFLIC solutions discussed below result from a development methodology that initially prototypes MICFLICs and microfluidic circuit elements (MICFLELs) using silicon microfabrication technologies as such techniques allow for rapid fabrication, precise control, and controlled variations to establish the design rules for the MICFLELs and MICFLICs respectively. Subsequently, such design rules can be employed to fabricate MICFLICs and MICFLELs in other manufacturing technologies including but not limited to molding, embossing, etc for exploitation of other materials and cost—volume production characteristics.

Accordingly, such MICFLICs and MICFLELs, which are referred to within this specification as first generation capillary programmed chips (CPCs), allow for the automated acquisition of a sample fluid and for it's processing with different reagents. Subsequently, these $1^{st}$ Gen CPCs provide the basis of subsequent generations of CPCs with additional features including, but not limited to:
rapid bacterial extraction systems inspired from CTC extraction methodologies;
colloidal-crystal capture zones that alleviate the need for high aspect ratios and facilitate low cost replication;
on-chip negative and positive control for high reliability analysis;
cold and hot embossing technologies; and
bacteriophage-based biological amplification for ultra-high sensitivity.

Figure 3:
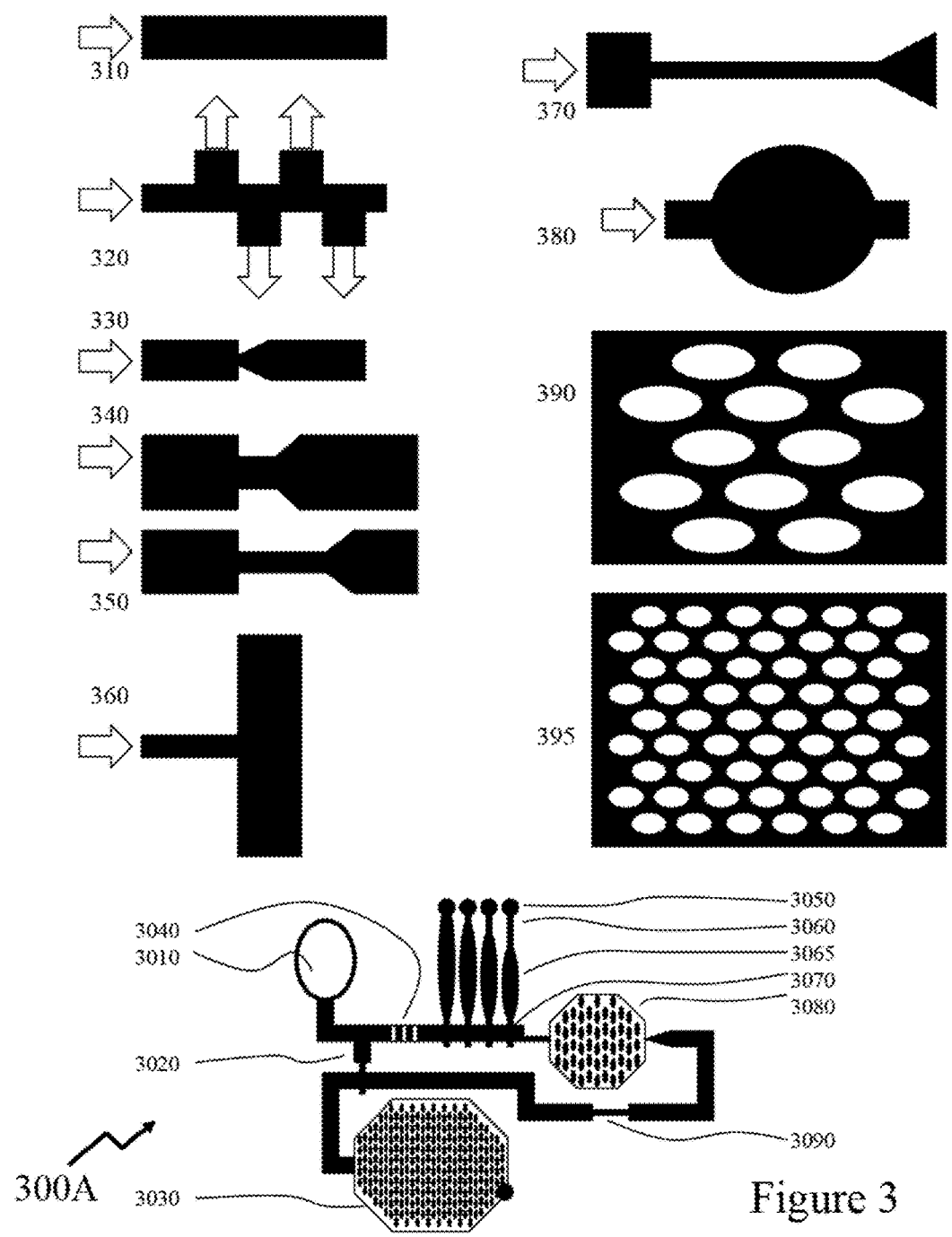
FIG. 3 depicts an exemplary library of microfluidic design elements as extended by embodiments of the invention and a self-power microfluidic analysis circuit employing such elements.

Accordingly first generation CPCs may include a MICFLIC employing MICFLELs such as depicted in FIG. 3 including, but not limited to microfluidic conduits (or channels) 310, flow routers 320, sequential programmable capillary retention valves (pCRVs) employing capillary retention valves (CRV) 330, positive pressure programmable retention burst valves (pRBVs) employing retention burst valves (pRBVs) such as low pressure pRBV 340 and high pressure RBV 350, programmable capillary trigger valve (pCTV) employing capillary trigger valve (CTV) 360, flow resistors 370, vents 380, and programmable capillary pumps (pCPumps) employing symmetric and asymmetric capillary pumps (CPumps) such as low pressure CPump 390 and high pressure CPump 395.

Accordingly as depicted in FIG. 3 with MICFLIC 300A comprising a filling port 3010 wherein the fluid flows initially past detection zones 3040 and pCTVs 3070 before filling incubation pump 3080 wherein its flow is at a flow rate designed to allow incubation before the fluid flows via flow resistor 3090 under the control of the waste pump 3030 wherein it passes pCTV 3020 triggering it and accordingly due to pressure changes induced within the MICFLIC 300A sequential release of reagents from the reagent reservoirs 3065 which are controlled through pRBVs 3060 and empty as air replaces the reagent through vents 3050.

MICFLIC 300A may for example be prefilled in the reagent reservoirs 3065 with buffer solution (one or several buffer solutions may be employed depending on the final protocol), biotinylated detection phage, streptavidin conjugated gold nanoparticles, and silver amplification reagents. Next, the fluid sample will is introduced into the filling port 3010, such as by contact to pricked patient skin or pipette for example triggering the sequential flow of all the reagents that with predetermined flow rates and duration as defined by the geometry of the MICFLELs within the MICFLIC 300A. For example MICFLIC 300A may be designed using capillary pumps with dimensions of a few tens of millimeters in size and 10 µl capacity, which is well suited for testing the functionality of the chip while allowing multiple design variants to be fabricated on a single wafer before capillary pump reductions are undertaken for production devices to reduce MICFLIC 300A footprint and hence lower per unit costs as well as allowing their operation at reduced sample fluid volumes. A typical MICFLIC 300A process may for example be 10 minutes for sample flow, 4 minutes exposure to biotinylated detection phages, 4 minutes for streptavidin conjugated gold processing, and 4 minutes for the silver enhancement wherein these are faster due to increased microfluidic flow rates, and 30 seconds for each buffer step where low resistance and rapid flow are implemented. With reduced sample fluid volumes and accordingly reagent volumes such processing times may be reduced in production devices against the approximate 28 minute process cycle of the prototype MICFLIC 300A.

Figure 2A:
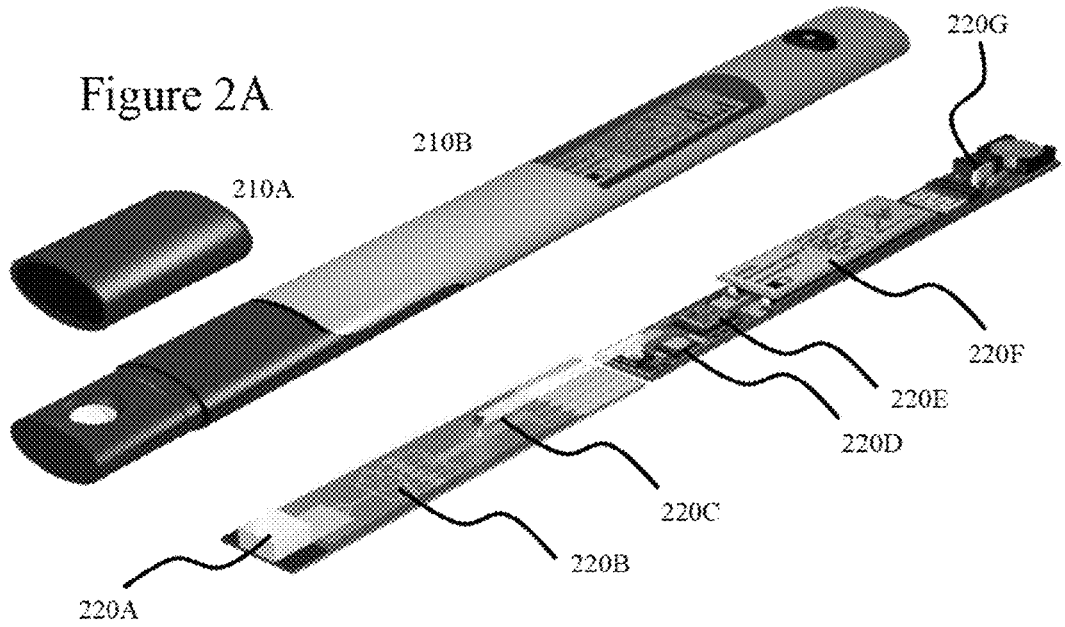
FIG. 2A depicts a point-of-care device as may be implemented using microfluidic devices according to embodiments of the invention FIGS. 2B through 2D respectively depict prior art microfluidics based upon chemical, centrifugal, and capillary techniques.
Figure 4:
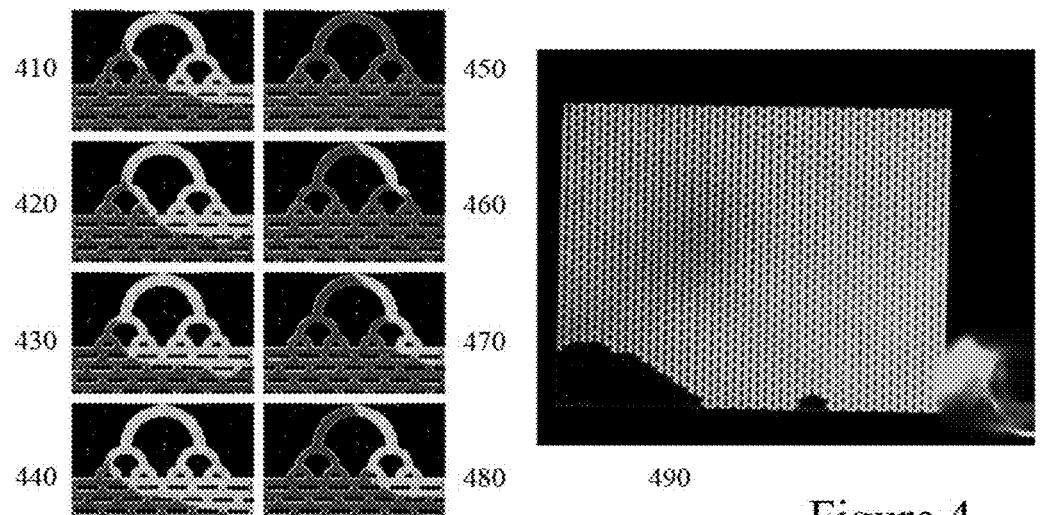
FIG. 4 depicts bubble trapping within microfluidic elements of the prior art.

Referring to FIG. 4 there are depicted first to eighth delay line combiners 410 through 480 respectively wherein a binary hierarchal tree of capillaries combines flows such as presented supra in respect of FIG. 2D and the MICFLIC of Gervais2 for coupling the blood filter to the MICFLIC. As evident only fifth delay line combiner 450 is completely dark with the fluid whereas the remaining delay line combiners all contain bubbles preventing full operation. In first, third, and fourth delay line combiners 410, 430, and 440 these bubbles actually prevent any fluid reaching the combined microfluidic conduit at the top of each image and accordingly such bubbles would prevent a MICFLIC functioning completely. Similarly, capillary pump 490 in FIG. 4 depicts a large air bubble in the lower left corner of the capillary pump 490 and a smaller air bubble towards the right of the lower edge. Accordingly, if the intention of the design of the MICFLIC incorporating capillary pump 490 was that the capacity of the reservoir was comparable to the total sample, reagent, wash fluid volumes required to be drawn past detection sites then it would be evident that the bubbles would represent that volume of the fluid not drawn as required. In this instance the undrawn volume of the pump is approximately 7% although larger bubbles have been observed. However, even 7% may equate to all of the volume of a final reagent rendering the MICFLIC useless. In other instances even the smaller bubble alone may represent a significant issue especially if it occurs at the inlet thereby blocking the capillary pump action.

Figure 5A:
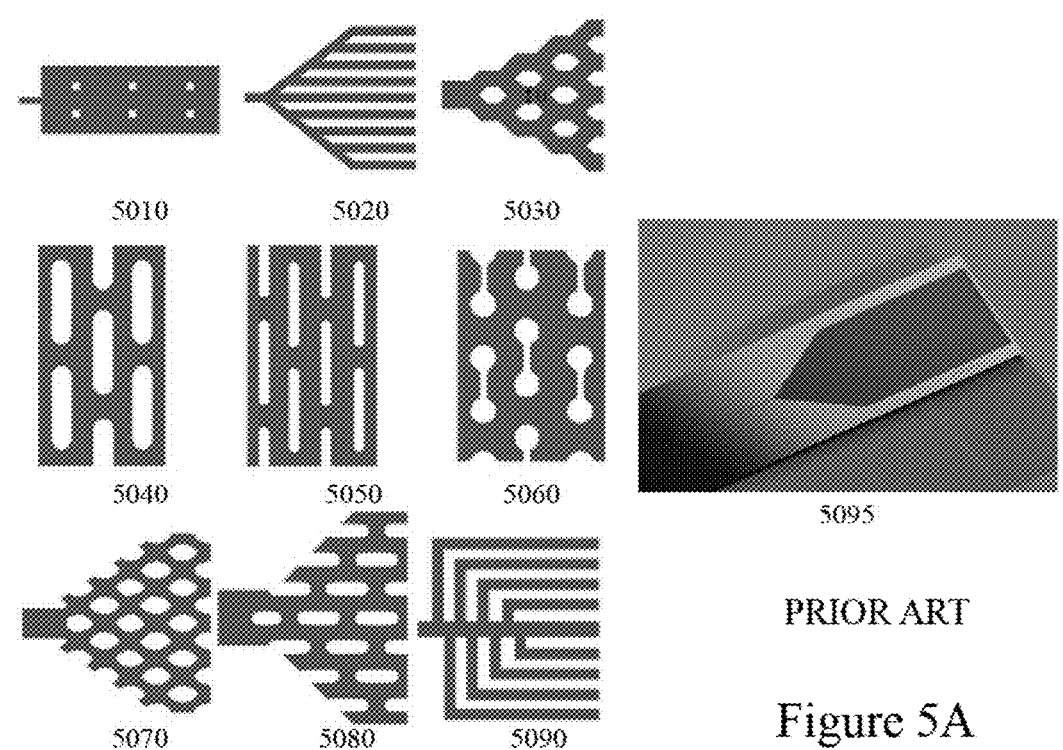
FIG. 5A depicts prior art design approach for capillary pumps and reservoirs.

Referring to FIG. 5A there are depicted basic capillary pump designs according to the prior art, such as first to ninth designs 5010 through 5090. First to third designs 5010 to 5030 respectively are early designs which are known as post, tree lines, and hexagons. Zimmerman, see Zimmerman1, extended this with the fourth to ninth designs 5040 through 5090 respectively which are more advanced designs known as symmetric lines, asymmetric lines, balled lines, rounded and interlocked hexagons, symmetric lines, and tree lines "b". In each instance these capillary pumps have a comparatively low flow resistance because of the large number of parallel flow paths and hence can used when volumes of liquid must be pumped at constant flow rate. The more advanced designs with elongated microstructures can be used to control the filling front of a liquid by imposing various time constants for the progression of a liquid along different directions of the capillary pump. Zimmerman also notes that it is important to connect the capillary pump correctly to the remainder of the MICFLIC to ensure that the capillary pressure is sufficiently high everywhere in the connecting region to draw liquid efficiently from the circuit to the capillary pump. This is achieved in this and other prior art be done by gradually expanding the lateral dimension of the capillary pump and centering one microstructure in the connecting channel at the entrance of the capillary pump. This approach is evident in capillary pump 5095 as reported by IBM (IBM Press Release "IBM Scientists Reinvent Medical Diagnostic Testing", Nov. 2009) wherein deep etching to 180 µm was employed.

Figure 5B:
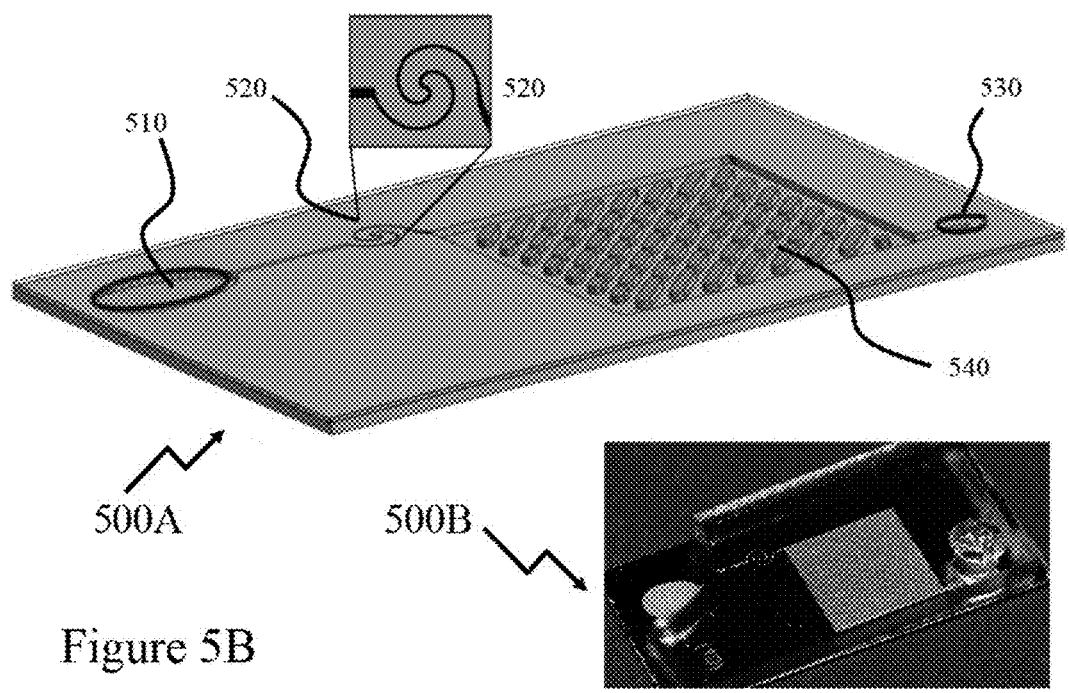
FIG. 5B depicts a design approach for capillary pumps and reservoirs according to an embodiment of the invention.

However, the inventors have established a different design methodology as evident in FIG. 5B wherein there are depicted schematic 500A and fabricated capillary pump 500B according to an embodiment of the invention. In schematic 500A an inlet port 510 is shown coupled to a microfluidic conduit which ends in a spiral flow resistor 520 which is formed from a first semicircular section in one direction followed by an S-shaped reversal loop and a second semicircular section. The spiral flow resistor 520 occupies reduced length compared to prior art flow resistors whilst the radius, number of effective turns and width reduction of the spiral flow resistor 520 relative to the microfluidic conduit define the flow resistance. The output of the spiral flow resistor 520 couples to capillary pump 540 and the output of the capillary pump 540 to the vent 530.

With respect to the spiral flow resistor 520 flow resistors within the prior art are long straight microchannels of reduced cross section. Since, the depth of the microchannels is generally constant along a MICFLIC as they are typically fabricated with single step lithography/etching then achieving a large flow resistances with small footprint requires that prior at designs have microchannels with high aspect ratio (AR), typically AR>5, see for example Zimmermann et al "Autonomous Capillary System for One-Step Immunoassays" (Biomedical Microdevices, Vol. 11, pp. 1-8, hereinafter Zimmerman2) and Zimmerman1. Although such high ARs can be fabricated using Deep Reactive Ion Etching in Silicon they increase manufacturing complexity and reduce yield which are contrary to the goals of low cost and disposable MICFLICs wherein we seek low AR flow resistors (i.e. AR<3), which could then be made using lower complexity higher yield silicon processes as well as out of plastics using hot-embossing and reel-to-reel techniques, see for example Becker et al in "Hot Embossing as a Method for the Fabrication of Polymer High Aspect Ratio Structures" (Sensors and Actuators A: Physical, Vol. 83, pp. 130-135) and Ruano-Lopez et al in "The SmartBioPhone: A Point of Care Vision under Development through two European Projects: OPTOLABCARD and LABONFOIL" (Lab on a Chip, Vol. 9, pp. 1495-1499). Such low AR process come with the price of having wider and longer resistances, which would result in having larger footprint of the circuit as well as increasing the cost and mobility of system. Consequently, we have designed spiral (coil shaped) microchannel resistors in order to minimize the footprint of these otherwise long resistors (i.e. a few millimeters). Fluidic PDMS microchannel resistors, compatible with the manufacturing process described below in respect of FIG. 17, with depth of 100 μm and width of 35 μm in the resistor section were fabricated with lengths varying from 600 μm to 25,000 μm with 8,000 μm microchannel connections to the capillary pumps. Flow rates for these resistors varied between 18 nl/s to 148 nl/s.

Figure 6:
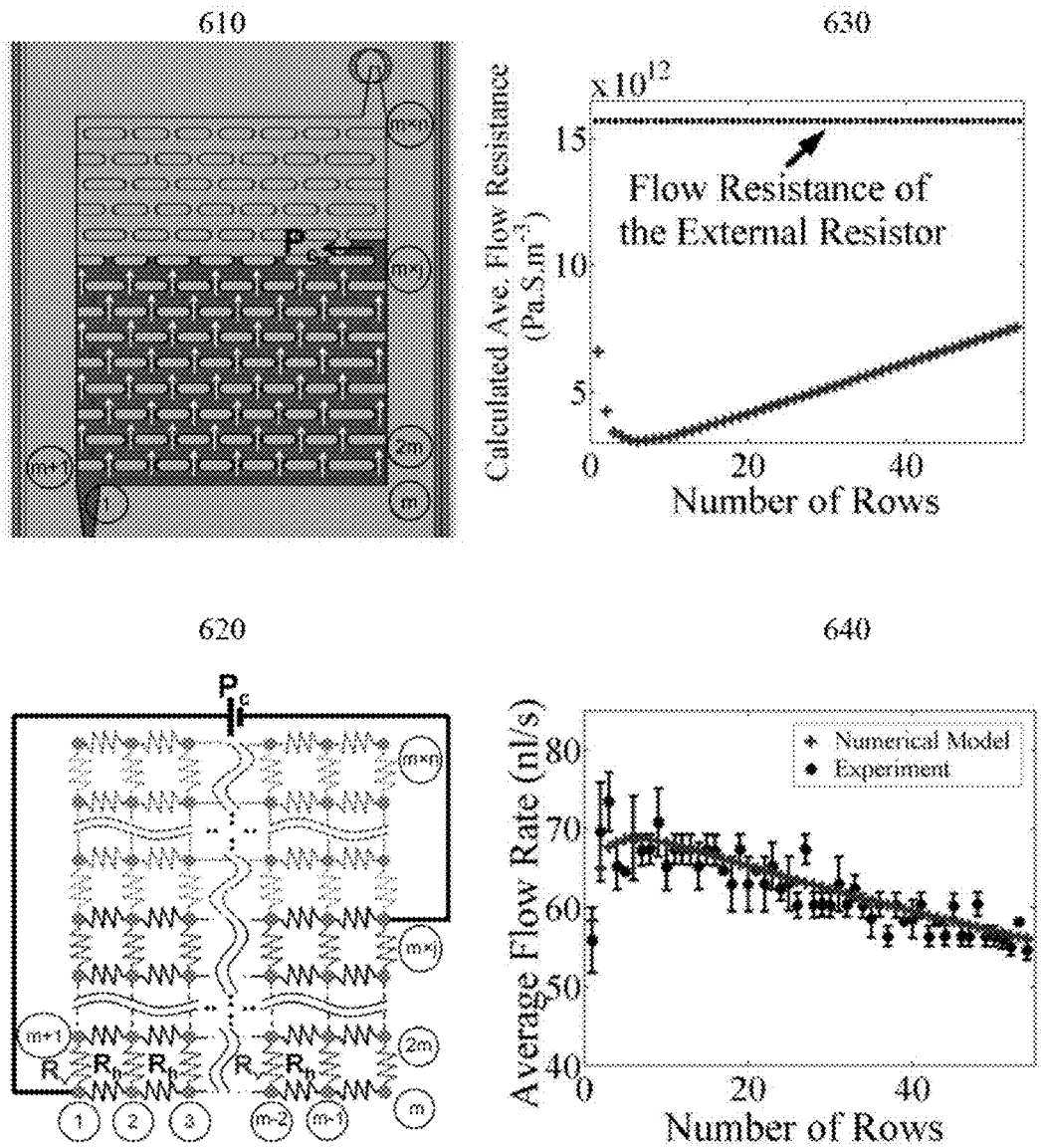
FIG. 6 depicts modeling of the flow within a microfluidic circuit for capillary pumps and reservoirs according to an embodiment of the invention.

In contrast, as evident from schematic 500A and fabricated capillary pump 500B, the inlet to a capillary pump according to embodiments of the invention, such as capillary pump 540, is offset to one corner of the reservoir and the vent 530 is similarly disposed at the opposite corner. Referring to FIG. 6 schematic 610 depicts a capillary pump according to an embodiment of the invention wherein a plurality, M, of hydrophilic elements are disposed cross the reservoir thereby forming M openings towards the outlet of the capillary pump. Similarly a second row of M hydrophilic elements form another series of openings M+1 to 2M which are offset relative to the first row of hydrophilic elements by half the pitch of the hydrophilic elements. This pattern repeats for the N rows disposed within the capillary pump such that there are M×N elements and M×N openings. Accordingly, each opening may be considered a node within a resistive network wherein adjacent nodes in a row are connected by resistive elements of resistance $R_H$ and nodes within adjacent rows are connected by resistive elements of resistance $R_V$ such as depicted in electrical equivalent circuit 620. Considering the fluid at the $M^{th}$ element in the $J^{th}$ row then a potential $P_C$ exists between this node and the input node to the capillary pump. This potential $P_C$ being equivalent in the fluid capillary pump to the pressure present at that point. Accordingly, simulations of the capillary pump may be executed such as presented in first and second graphs 630 and 640 respectively.

First graph 630 depicts the calculated average flow resistance within the capillary pump with row number is depicted as well as the flow resistance of the external flow resistor. Accordingly, the resulting average flow rate with row number was determined and compared to experimental results as depicted in second graph 640. It is evident in this that the average flow rate follows an inverse relationship to the flow resistance as anticipated. Accordingly, flow within the capillary follows a pattern wherein it flows within a row and into the adjacent row. Referring to first and second schematics 700A and 700B it is evident that with adjustments in the dimensions of the hydrophilic elements that the flow resistance of the capillary pump may be varied overall and within. Referring to first schematic 700A the capillary pump according to an embodiment of the invention is unlike the prior art capillary pumps and capillary pump 610 in FIG. 6 in that the pump inlet 725 from the flow resistor 710 is orientated at 45° to each sidewall of the capillary pump 720 in first schematic 700A. Further, the hydrophilic elements 730 are orientated at an angle α to the sidewall. With a large spacing row-row and narrow openings between hydrophilic elements 730 the flow within capillary pump 720 is essentially a meander 740 as rows fill preferentially such that fluid flow between rows trapping air is slower and accordingly less likely to occur.

Figure 7:
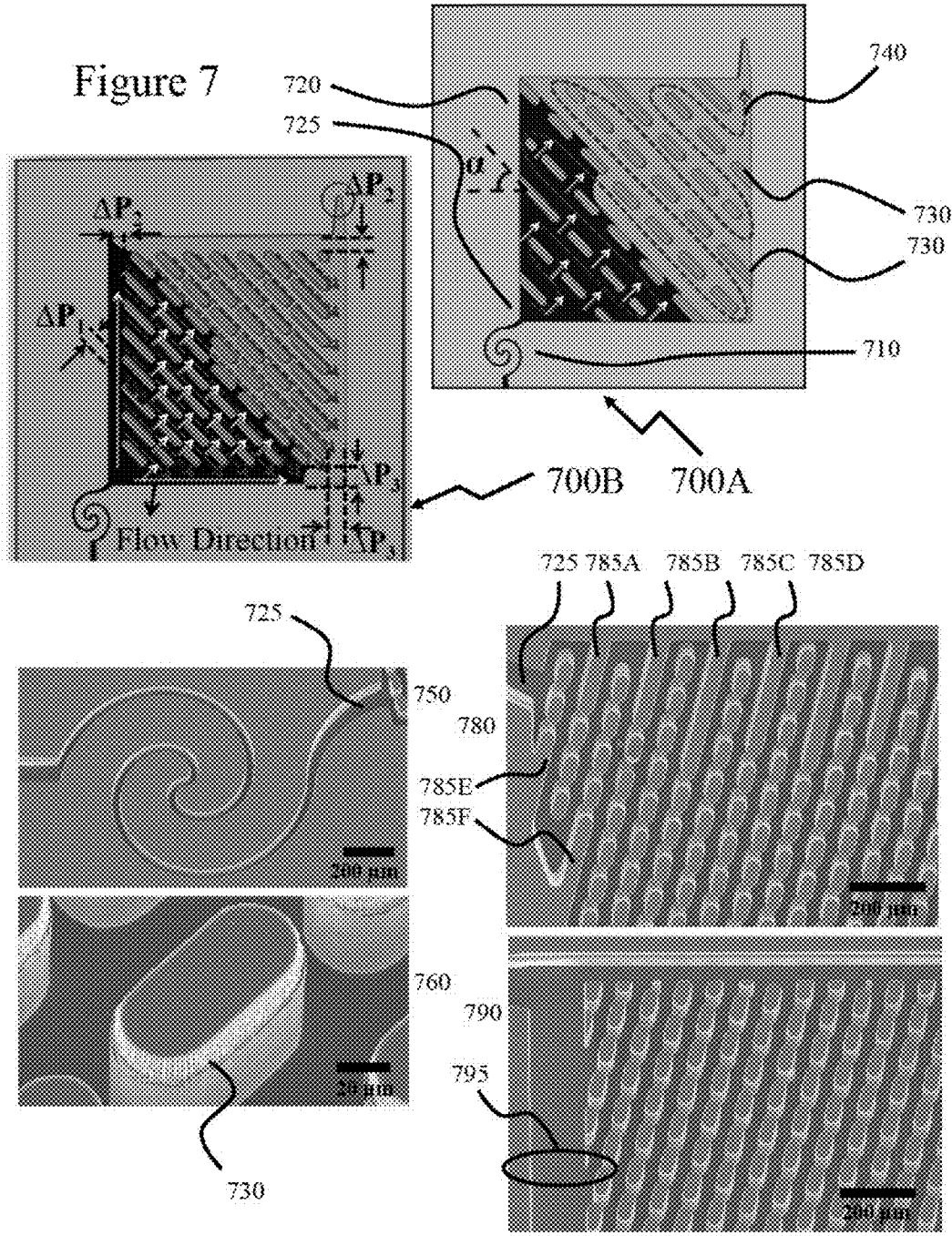
FIG. 7 depicts a design approach and manufactured microfluidic circuits for capillary pumps and reservoirs according to an embodiment of the invention.

Second schematic 700B depicts a variant capillary pump according to an embodiment of the invention wherein the hydrophilic elements do not extend to the sidewalls of the capillary pump such that direct capillary flow down the edges of the capillary pump sidewalls occurs as well as the flow along a row and between rows. Accordingly, by appropriate design the flow rates within the capillary pump can not only be set to the desired level but simulated and adjusted to ensure filling occurs in controlled manner. Also depicted in FIG. 7 are first to fourth SEM micrographs 750, 760, 780 and 790 respectively. First SEM micrograph 750 depicts a flow resistor and the taper coupling region to the capillary pump, pump inlet 725. Second SEM micrograph 760 depicts a hydrophilic element 730 showing the rounded profile of the hydrophilic elements 730 such that flow occurs in gradual rather than abrupt flows. Third SEM micrograph 780 depicts the region of a capillary pump according to another embodiment of the invention close to the pump inlet 725 showing that in addition to the hydrophilic elements first to sixth projections 785A through 785F are implemented in place of hydrophilic elements in order for the flow within the capillary pump to be controlled in the desired meander flow pattern initially. Fourth SEM micrograph 790 depicts a capillary pump such as described supra in respect of second schematic 700B wherein a channel 795 is provided around the edge of the capillary pump thereby providing an initial low resistance path for the fluid prior to it filling the rows.

Capillary pumps according to embodiments of the invention such as described supra in respect of first schematic 700A in FIG. 7 are referred to as "serpentine" pumps by the inventors and are characterised by features such as wide gaps between rows directing the filling front perpendicularly to the overall flow direction, separation walls at the end of each row acting as stop valves, and narrow gaps between hydrophilic elements acting as capillary valves. In contrast the capillary pumps according to embodiments of the invention as described supra with respect to second schematic 700B in FIG. 7 are referred to as "leading edge" pumps by the inventors and are characterized by the gaps around the edges wherein these gap sizes are selected such that the pressure difference between sequential rows, $\Delta P_1$, is greater than the pressure difference between the fluid within the rows and the spaces along the sidewall adjacent to the pump inlet and this sidewall and pump vent, $\Delta P_2$, and these are both greater than the pressure difference between the fluid within the rows and the other two sidewalls, $\Delta P_3$, as denoted by Equation (3) below.

$$\Delta P_1 > \Delta P_2 > \Delta P_3 \qquad (3)$$

Figure 8:
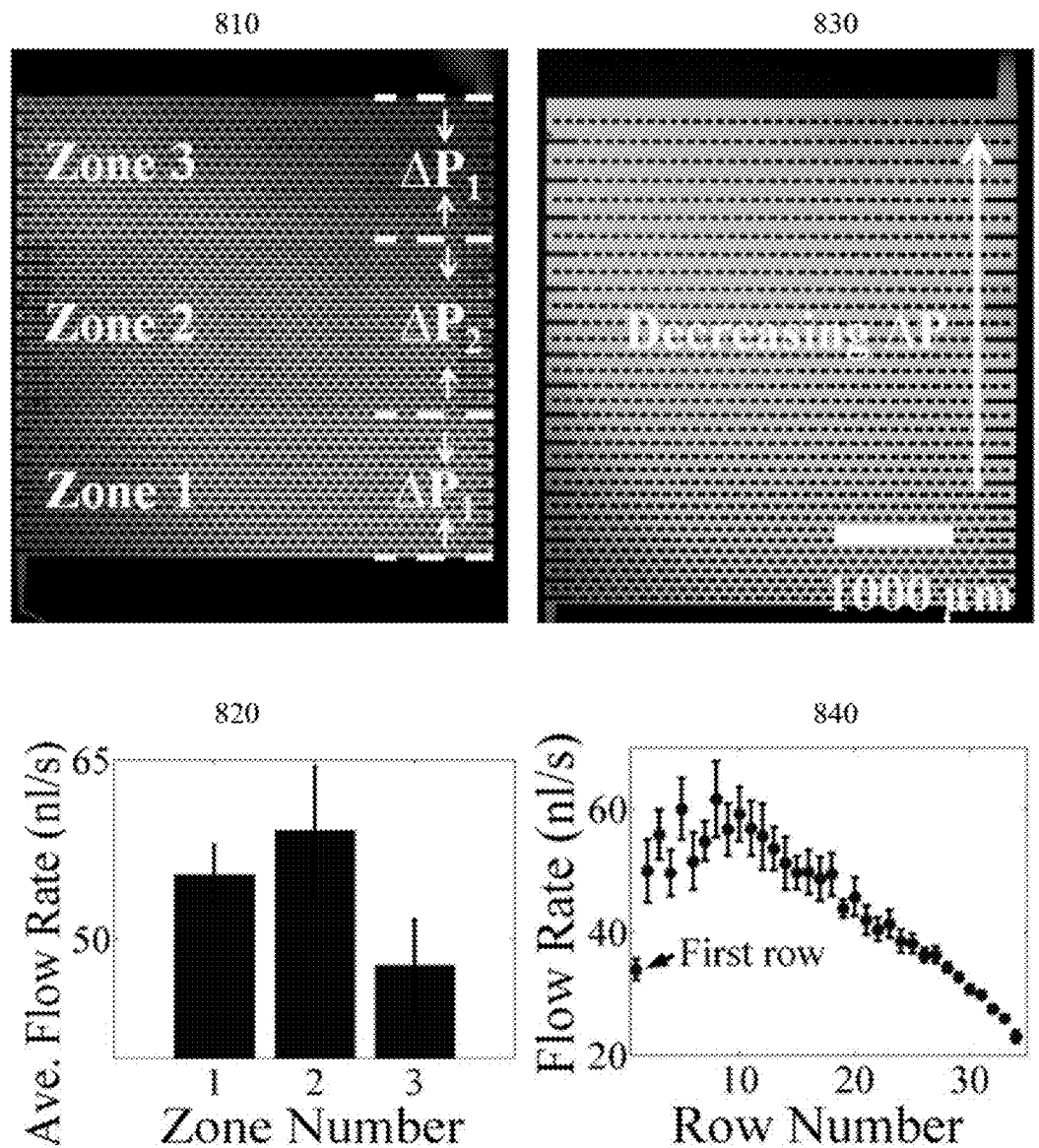
FIG. 8 depicts discrete pressure zone and continuously variable pressure zone capillary pumps and reservoirs according to embodiments of the invention.

Now referring to FIG. 8 there are depicted first and second micrographs 810 and 830 of capillary pumps according to embodiments of the invention. First micrograph 810 depicts a capillary pump comprising three pressure zones, denoted as Zone 1, 2, and 3 which have pressure differences $\Delta P_1$, $\Delta P_2$, and $\Delta P_1$ respectively. Second micrograph 830 depicts a capillary pump wherein the pressure difference between rows of hydrophilic elements, $\Delta P$, decreases across the capillary pump. First graph 820 depicts the average flow rate within the three different zones of the capillary pump depicted in first micrograph 810. Accordingly, in Zone 1 average flow rate was approximately 55 nl/s, rising to approximately 60 nl/s in Zone 2, and reducing to approximately 45 nl/s in Zone 3. Second graph 840 depicts the average flow rate for the capillary pump depicted in second micrograph 830. Accordingly, the flow rate drops from approximately 60 nl/s in row 10 to approximately 20 nl/s in row 34. Accordingly, it would be evident that capillary pumps according to embodiments of the invention may be implemented with rectangular geometries as well tapered geometries that provide for controlled pressure, and hence flow, profiles with designs that reduce bubble formation by controlling the flow of the fluid overall within the capillary pump structure.

Further the capillary pumps described in respect of embodiments of the invention in FIGS. 5B through 8 respectively may be implemented using RIE, deep RIE (DRIE), embossing, molding etc as aspect ratios and depths are not typical of those within the prior art, c.f. Zimmerman1 180 μm deep etching with capillary pump features of dimensions down to 15 μm representing etching aspect ratios up to 16:1.

Figure 9A:
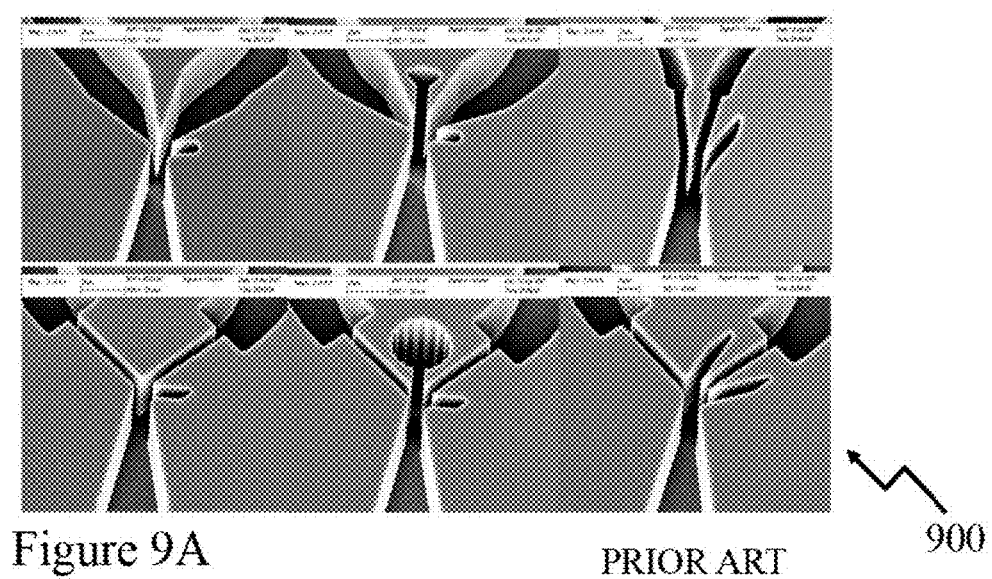
FIG. 9A depicts capillary trigger valves according to the prior art.

As described supra in respect of the applications of MICFLICs a common requirement is the ability to sequentially release reagents through the use of capillary trigger valves (CTVs). Within the prior art CTVs employed an intersection between two channels such as depicted in FIG. 9A with SEM micrographs 900 according to Zimmerman et al in "Valves for Autonomous Capillary Systems" (Microfluid Nanofluid, Vol. 5, pp. 395-402, hereinafter Zimmerman3). These prior art CTVs employ a first channel which terminates in a stop valve whilst the second channel has a meandering short capillary acting as a flow resistance. A stop valve is designed to eliminate the curvature of a meniscus of the fluid so the capillary pressure is reduced, ideally to zero. This is achieved by reducing the width of the microfluidic channel and abruptly enlarging it. Accordingly, fluid in the first channel, right hand side of each micrograph, acts as stop valve and the second channel acts as the trigger. Whilst the microfluidic flow resistances designed within the CTVs depicted lead to equal flow from each inlet once the CTV is actuated it would be evident that asymmetric flow rates can also be programmed. Zimmerman's designs require that the 30 μm wide and 60 μm deep microfluidic channels were transitioned to 4 μm channels to achieve the desired stop valve performance forcing manufacturing aspect ratios to 15:1.

Figure 9B:
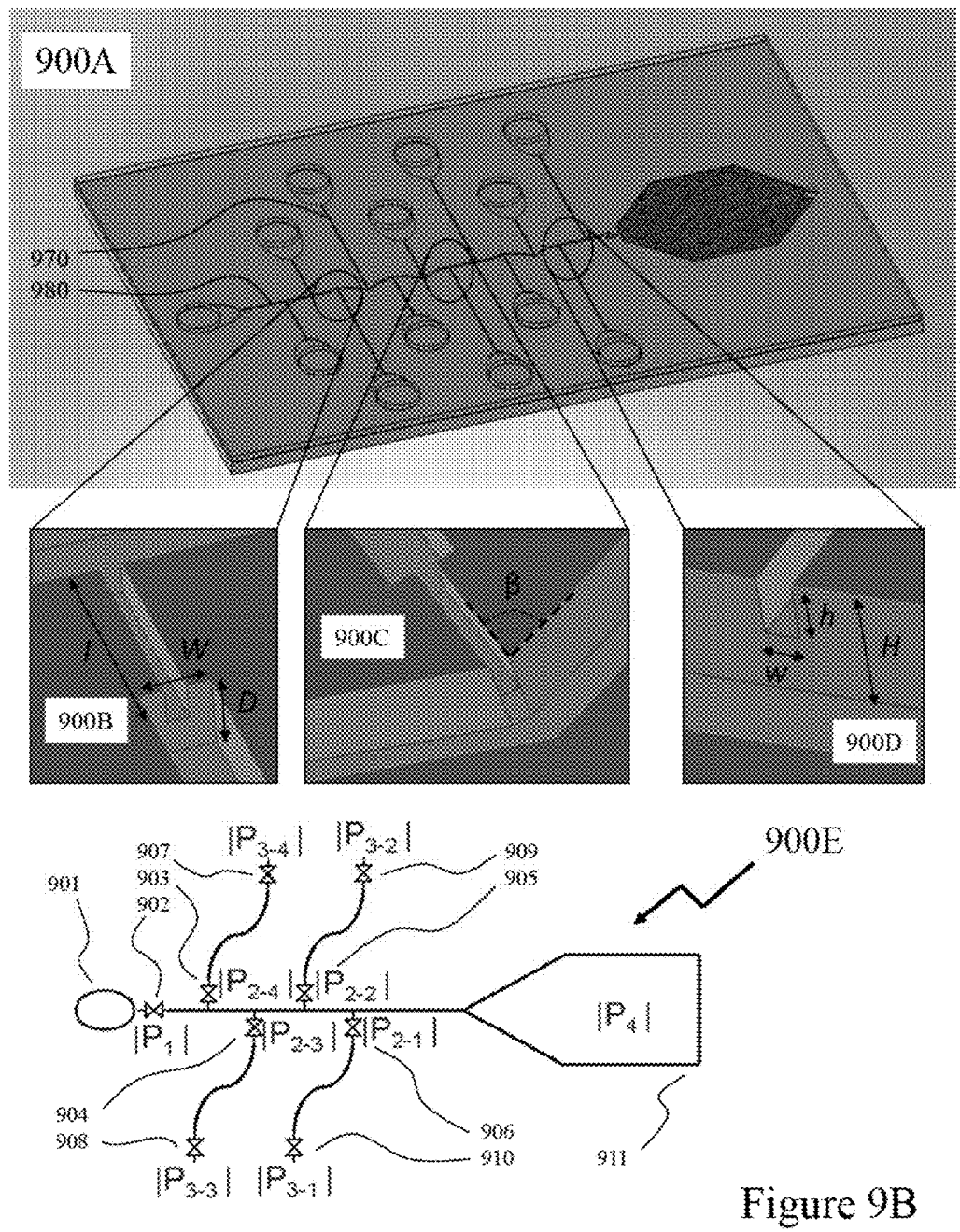
FIGS. 9B and 9C depict programmable capillary trigger valves according to an embodiment of the invention.

Referring to FIG. 9B there is depicted a MICFLIC 900A comprising a filler port, 12 CTVs according to embodiments of the invention and a capillary pump. MICFLIC 900A indicates the level of complexity that some POC devices will require with multiple reagents, multiple washing steps, etc. First to third insets 900B through 900D depict CTV design parameters for CTVs according to embodiments of the invention as well as programmable CTVs (pCTVs) allowing triggering at different thresholds within the same MICFLIC 900A. First to third inserts 900B through 900D respectively depict a CTV according to an embodiment of the invention from the perspective of internal to the substrate wherein a narrow and shallow channel of length 1, width w, and height h connects between a fluid channel 980 of height H and reagent channel 970 of width W and depth D. Accordingly, the fluid within the reagent channel 970 at the junction with the fluid channel 980 intersects a surface, the sidewall of fluid channel 980, that extends away in each direction such that the design criteria for reducing the capillary pressure is met such that the narrow and shallow channel acts as a stop valve.

Also depicted in FIG. 9B there is test circuit 900E comprising filler port 901, capillary pump 911 at pressure $|P_4|$, and 4 reagent channels which at one end have first to fourth retention burst valves 907 through 910 respectively coupling to vents and at their other end to first to fourth retention valves 903 through 906 respective. Accordingly, the first to fourth retention valves 903 through 906 respectively act to pin the liquid within each such that the respective channels coupled to each of first to fourth retention valves 903 through 906 respectively are not drained completely or introduce air bubbles. As such the pressure $|P_4|$ from the capillary pump must not exceed the retention pressure of the first to fourth retention valves 903 through 906 respectively, as described by Equation (4A) below. In contrast the first to fourth retention burst valves 907 through 910 are intended to burst connecting the associated channel to the vent such that the liquid can drain from them. Accordingly, in order for these first to fourth retention burst valves 907 through 910 respectively to operate in sequence then these should meet the conditions defined in Equation (4B) such that the capillary pump pressure $|P_4|$ exceeds them during operation and they burst sequentially.

$$|P_4|<|P_{2-1}| \ \& \ |P_{2-2}|\&|P_{2-3}|\&|P_{2-4}|\&|P_1| \tag{4A}$$

$$|P_{3-1}|<|P_{3-2}|<|P_{3-3}|<|P_{3-4}|<|P_4| \tag{4B}$$

$$|V_{3-1}|<|V_{3-2}|<|V_{3-3}|<|V_{3-4}| \tag{5}$$

The volume of liquid within each channel/reservoir between a retention valve and a retention burst valve may also be adjusted such that the even if the flow rate arising from the capillary pump is equal in all channels/reservoirs that the retention burst valves will still burst in sequence. This volume relationship is given in Equation (5) above. However, in some instances multiple reagents may be required to flow simultaneously within the MICFLIC wherein there is a disadvantage or drawback of mixing these multiple reagents in a single reservoir for an extended period of time. In such instances retention burst valves may be designed to trigger within a predetermined range of one another to facilitate this.

Figure 9C:
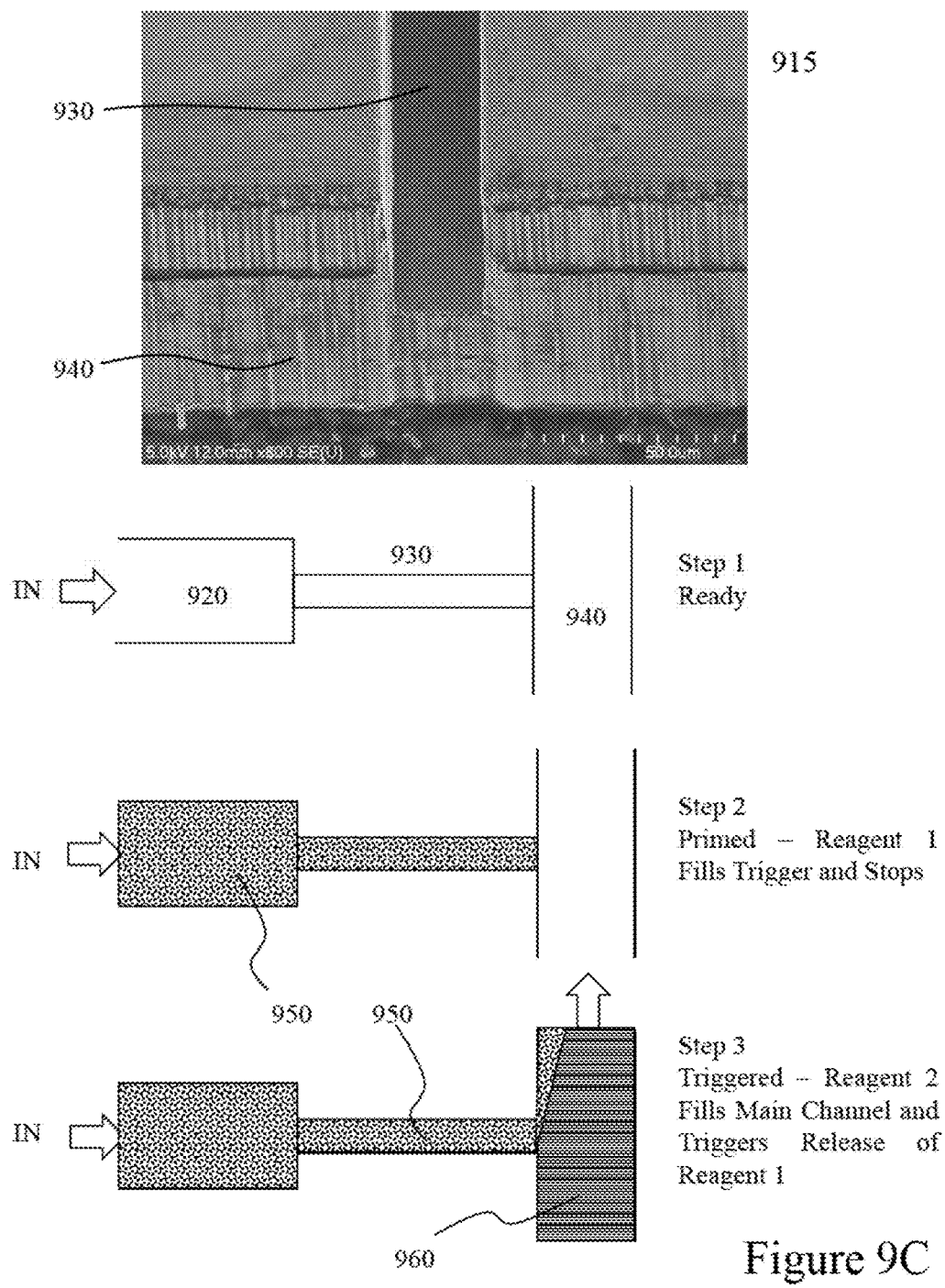

Now referring to FIG. 9C there is depicted SEM micrograph 915 for a CTV according to an embodiment of the invention wherein the shallow, narrow reagent channel 930 intersects the sidewall of the fluid channel 940. A typical trigger valve compatible with PMDS MICFLIC circuits may have a width of 35 μm and depth 50 μm with connecting microchannel with the retained fluid of width 100 μm.s Also depicted are first to third steps for a CTV according to an embodiment of the invention wherein a fluid channel 940 intersects reagent channel 930 and reagent reservoir 920. Reagent channel 930 being shallower than the depths of both the fluid channel 940 and reagent reservoir 920 and narrower than the width of reagent reservoir 920. Next in the second step the reagent 950 is added to the reagent reservoir 920 from the other end which is not shown for clarity but comprises a retention valve. Accordingly the reagent reservoir 920 fills initially followed by reagent channel 930 wherein when the reagent 950 reaches the end of the reagent channel 930 its pressure has reduced and the flow stops. Accordingly, the reagent 950 will remain within the reagent reservoir 920 and reagent channel 930 until the CTV is triggered absent leakage. Accordingly, in a third step a fluid 960 is coupled to the fluid channel 940 wherein as the fluid 960 passes the end of the reagent channel 930 changing the boundary condition of the reagent 950 within the reagent channel 930 such that it now flows into the fluid channel 940 and mixes with the fluid 960.

This process can be seen in first to fourth still images 9110A through 9110B respectively in FIG. 9D wherein first still image 9110 A is at time t=0 s prior to the addition of the reagent, second still image 9110B is at time t=1 s with the addition of the reagent, and third still image 9110C is at time t=20 min prior to triggering the CTV with the addition of the fluid to the fluid channel which is shown in fourth still image 9110D is at time t=20 min after the fluid has been introduced. Within the prior art CTVs have been reported as having reducing yield with increasing retention time which has been attributed to variations in manufacturing and leakage from the CTV prior to its intended triggering resulting in triggering of the CTV. The inventors have established that the prior art solutions focused to considerations of the design of microfluidic channels and their manufacturing processes. In contrast prior art trigger valves such as reported by Zimmerman, see Zimmerman3, and depicted in fifth to eighth images 9120A through 9120D representing under 2 seconds of elapsed time failed even those these valves consisted of a PDMS sealing layer, which was hydrophobic and the MICFLIC is hydrophilic. Zimmerman found that although the PDMS limits trigger valve failure at the top wall that the trigger valves failed after a few seconds by leaking through the bottom wall, which is hydrophilic and accordingly, in order to address this the bottom wall was reduced by fabricating high AR trigger valves, i.e. depth/width>10, such as depicted in FIG. 9A by SEM micrographs 900.

In addition to the design of the trigger valve described above in respect of SEM micrograph 915 etc with single channel of lower depth the inventors have also prototyped other designs including those depicted in FIG. 9D comprising:

two-channel trigger valve 9130 which decreases resistance and increased desired flow rate without comprising the trigger valve performance;
  two channel trigger valve 9140 with increased width and lower aspect ratio;
  three channel trigger valve 9150; and
  V trigger valve 9160 within a V-shaped microchannel for improved trigger valve performance with lower surface tension fluids.

The inventors have, whilst developing trigger valves compatible with low cost, low AR manufacturing processes have also shown that an important factor is the upper surface of the microchannel, defined by the cover, and its breaking of the design criteria for the fluid within the trigger valve. Accordingly, in order to address this as depicted in FIG. 9D a cross-section of a cover above the CTV is depicted wherein a recess 972 within the cover 980 over the reagent reservoir 920, reagent channel 930, and fluid channel 940, so that the fluid within the reagent channel 930 meets the criteria of opening into a void. Alternatively the inventors employ a flat cover 980 to the MICFLIC but it is hydrophobic either over its entire surface or in the region local to the CTV.

Figure 10A:
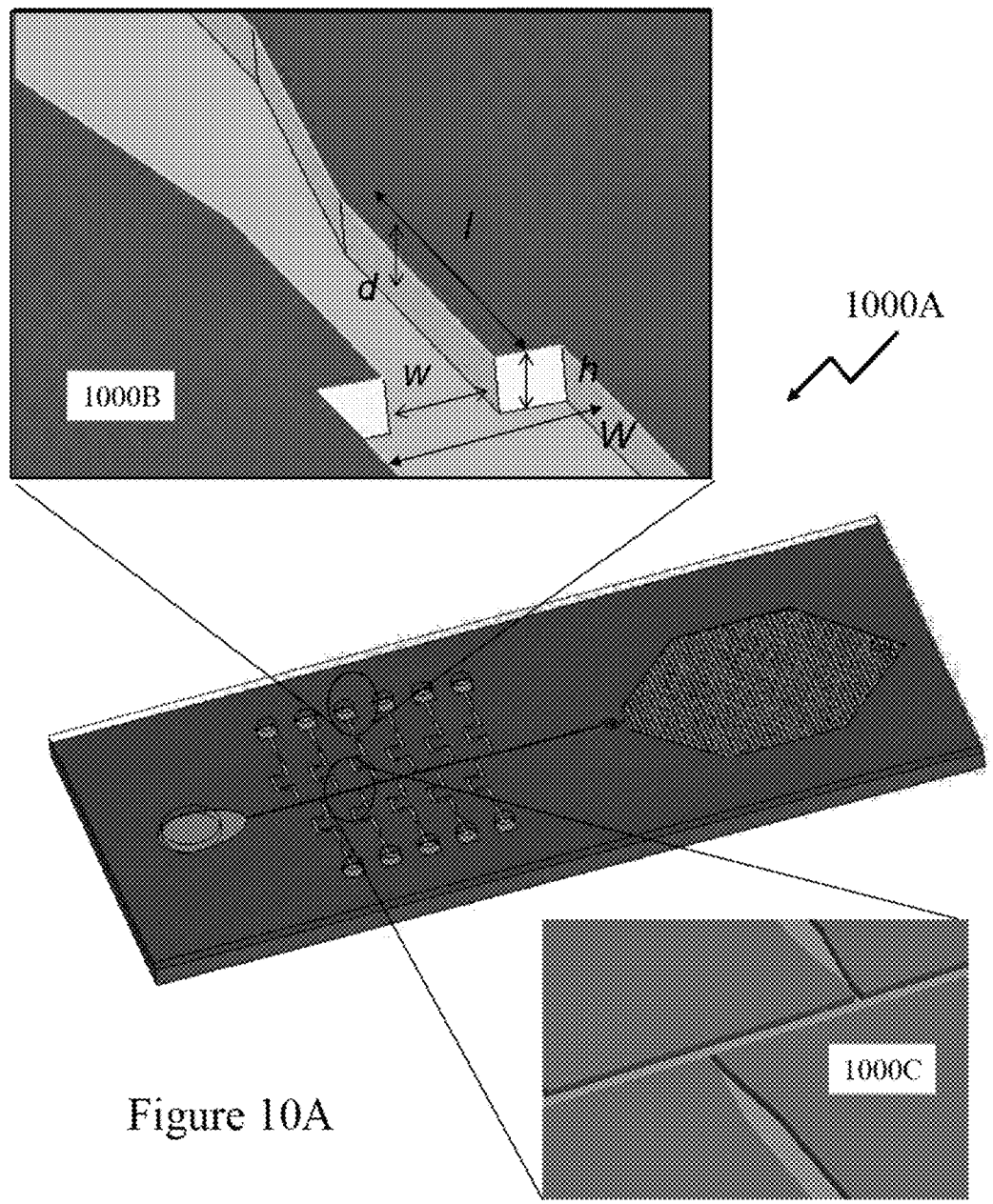
FIGS. 10A and 10B depict advanced programmable capillary retention valves according to embodiments of the invention.

Now referring to FIG. 10A there is depicted a MICFLIC 1000A wherein a plurality of sample channels are depicted between a filler port and a capillary pump. As discussed supra flow router elements 1000C couple the fluid into the retention channels wherein the fluid is then retained until the CRV is triggered allowing the retained fluid to drain back out of the retention channel. Accordingly at the other end of the retention channel a capillary retention valve (CRV) is employed between the retention channel and the vent such as depicted by insert 1000B. As depicted the retention channel of width W and depth h transitions to a narrow channel section of width w, depth d, and length l prior to tapering back to an increased dimension, e.g. the original channel width and depth or to an further third set of dimensions and thereafter a vent of the MICFLIC.

Figure 10B:
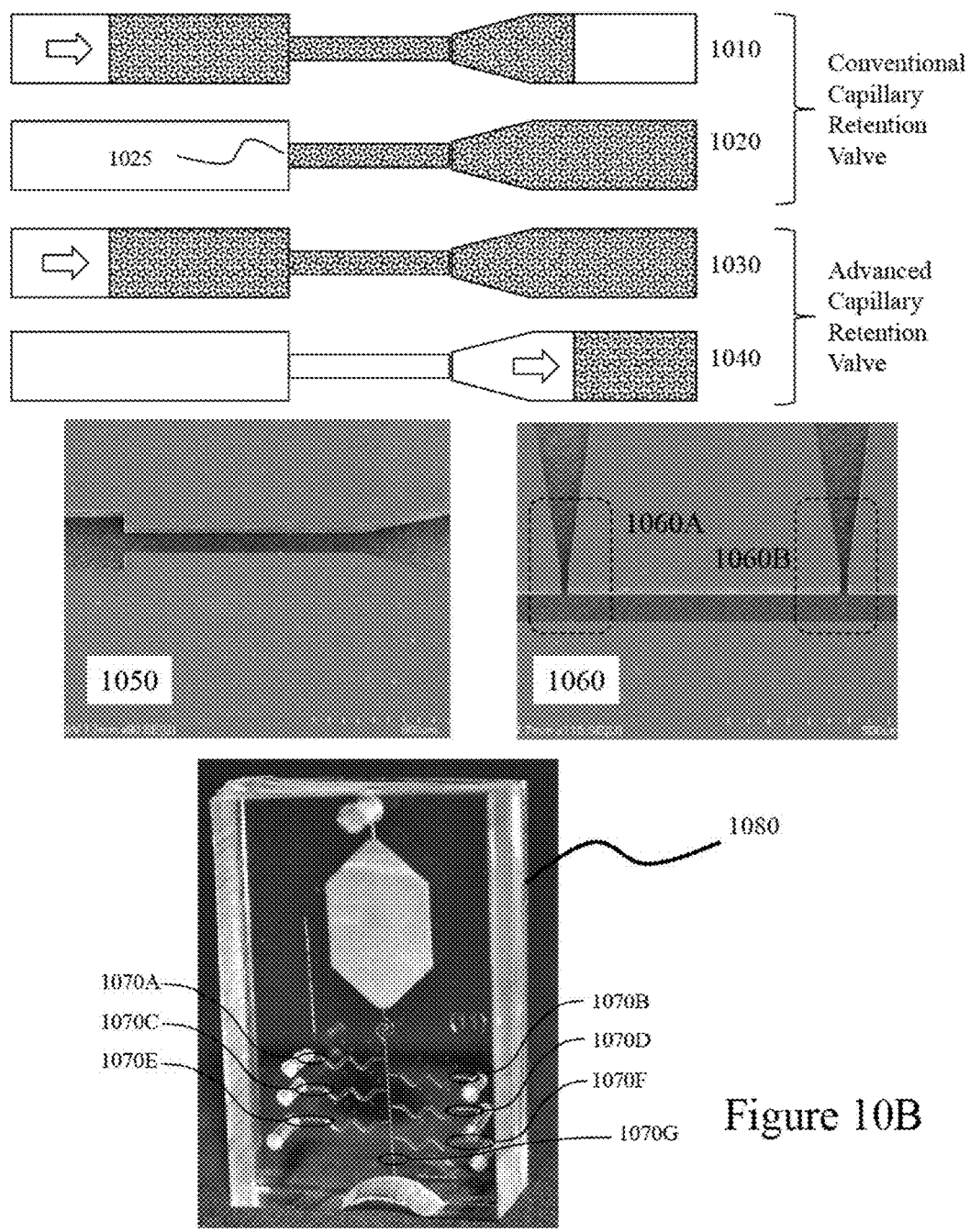

Within the prior art as depicted by first and second images 1010 and 1020 in FIG. 10B a conventional CRV is depicted in active and complete configurations wherein once the CRV is active the fluid within the CRV drains, first image 1010, until as indicated in second image 1020 it is pinned at the interface 1025. In contrast as indicated by third and fourth images 1030 and 1040 once the CRV is active the fluid drains within the CRV, third image 1030, but the advanced CRV according to embodiments of the invention does not pin and hence the fluid continues to drain, fourth image 1040. Fifth image 1050 depicts a CRV according to an embodiment of the invention whilst sixth image 1060 depicts two flow router elements 1060A and 1060B. Programmable CRVs (pCRVs), also known as programmable retention burst valves (pRBVs), are implement by adjusting the size of the microfluidic channel cross-section and the length of the narrow section with additional potential to adjust through the transition to the vent. The negative pressure required to "burst" a pCRV (pRBV) increases as the channel cross-section narrows and increases in length. The minimum cross-section, and hence maximum CRV retention pressure, is constrained by the pressure of the capillary pump, which needs to be sufficient to drain the liquid. Optionally in the generalized design regime the narrow channel section may be shallower than that of the retention channel whereas within FIGS. 10A, 10B, and 10D it is depicted at the same depth for reduced manufacturing complexity. Optionally the transition from the narrow region may be abrupt at either end.

Also depicted in FIG. 10B is MICFLIC 1080 employing MICFLELs according to embodiments of the invention including first to sixth pCRVS (pRBVs) 1070A to 1070F respectively as well as seventh pCRV (pRBV) 1070G on the main sample fluid channel between the filler port and the first microfluidic circuit elements. Within the prior art pRBVs are designed on the basis that increasing the capillary pressure within the section of reduced width establishes the burst pressure of the pRBV. Within FIG. 10C first circuit schematic 1000F depicts a test MICFLIC wherein the geometry of the pRBVs varies only in the width of the conduit. Accordingly disposed between first filling port 1011 and first capillary pump 1032 is first conduit 1013 with first flow resistor 1031 and six reservoirs with first to sixth pRBVs 1021 through 1026 respectively at one end and capillary retention valves (CRVs) 1027 at the end joining the first conduit 1013. The primary conduit dimension was, W, 100 µm wherein the CRVs 1027 were dimensioned of length 100 µm and conduit width 45 µm. For first to sixth pRBVs 1021 through 1026 respectively their length was constant at l=100 µm whilst the width of the conduits was W=100 µm at either end and minimum widths w=50, 55, 60, 65, 70, 75 µm. Repeated experimentation with such pRBVs resulted in inconsistent sequential draining of the conduits in a robust manner.

Accordingly, as indictated in second circuit schematic 1000G a test MICFLIC was tested wherein the geometry of the pRBVs varied only in the length of the conduit. Disposed between second filling port 1012 and second capillary pump 1034 is second conduit 1014 with second flow resistor 1033 and eleven reservoirs with first to eleventh pRBVs 1041 through 1049, 1051, and 1052 respectively at one end and capillary retention valves (CRVs) 1027 at the end joining the second conduit 1014. The primary conduit dimension was, W, 100 μm wherein the CRVs 1027 were dimensioned of length 100 μm and conduit width 45 μm. For first to eleventh pRBVs 1041 through 1049, 1051, and 1052 respectively their width dimensrions were constant at W=100 μm and w=90 μm at minimum width. However, their lengths were sequentially increased by 50 μm from l=100 μm to l=600 μm. Again repeated experimentation with such pRBVs resulted in inconsistent sequential draining of the conduits in a robust manner. In each of first and second circuit schematics 1000F and 1000G the conduit depth was h=100 μm.

Based upon modeling and experimental results the inventors identified that reproducible, reliable pRBVs could be obtained by a combination of not only adjusting both the width and length of the pRBV but also through the volume of the fluid retained within the reservoirs (conduits) between the CRV at the conduit and the pRBV to the vent. Accordingly, a test circuit providing reliable sequential triggering of the multiple pRBVs is depicted within third schematic 1000H in FIG. 10C. Disposed between third filling port 1016 and third capillary pump 1036 is third conduit 1015 with third flow resistor 1035 and six reservoirs with first to sixth pRBVs 1061 through 1066 respectively at one end and capillary retention valves (CRVs) 1027 at the end joining the second conduit 1014. As with first and second circuit schematics 1000F and 1000G respectively the primary conduit dimensions were W=100 μm and h=100 μm whilst the CRVs 1027 were dimensioned of length 100 μm and conduit width 45 μm but in this instance the reservoirs were dimensionsed to a width of 200 μm. Referring to Table 1 below the minimum width, W, of the pRBVs is listed as well as the length, l.

As evident with increasing retention pressure, which increases with decreasing width W as taught within the prior art it was found that the length of the pRBV should also be increased with increasing design retention pressure for the pRBV. It would be evident from the dimensions for sixth pRBV 1066 that it is in fact it is a direct microconduit link to its vent. In some instances the length and width of the pRBV may not follow a simple linear sequence due to a variety of factors including, but not limited to, the capillary pump pressure with time, reservoir volume, etc such that the pRBV pressure sequence is adjusted to aspects of the specific MICFLIC.

TABLE 1

Design Parameters for pRBVs

| pRBV | W (μm) | l (μm) |
|---|---|---|
| 1061 | 90 | 1500 |
| 1062 | 100 | 1250 |
| 1063 | 110 | 1000 |
| 1064 | 120 | 750 |
| 1065 | 130 | 500 |
| 1066 | 200 | 0 |

Figure 10C:
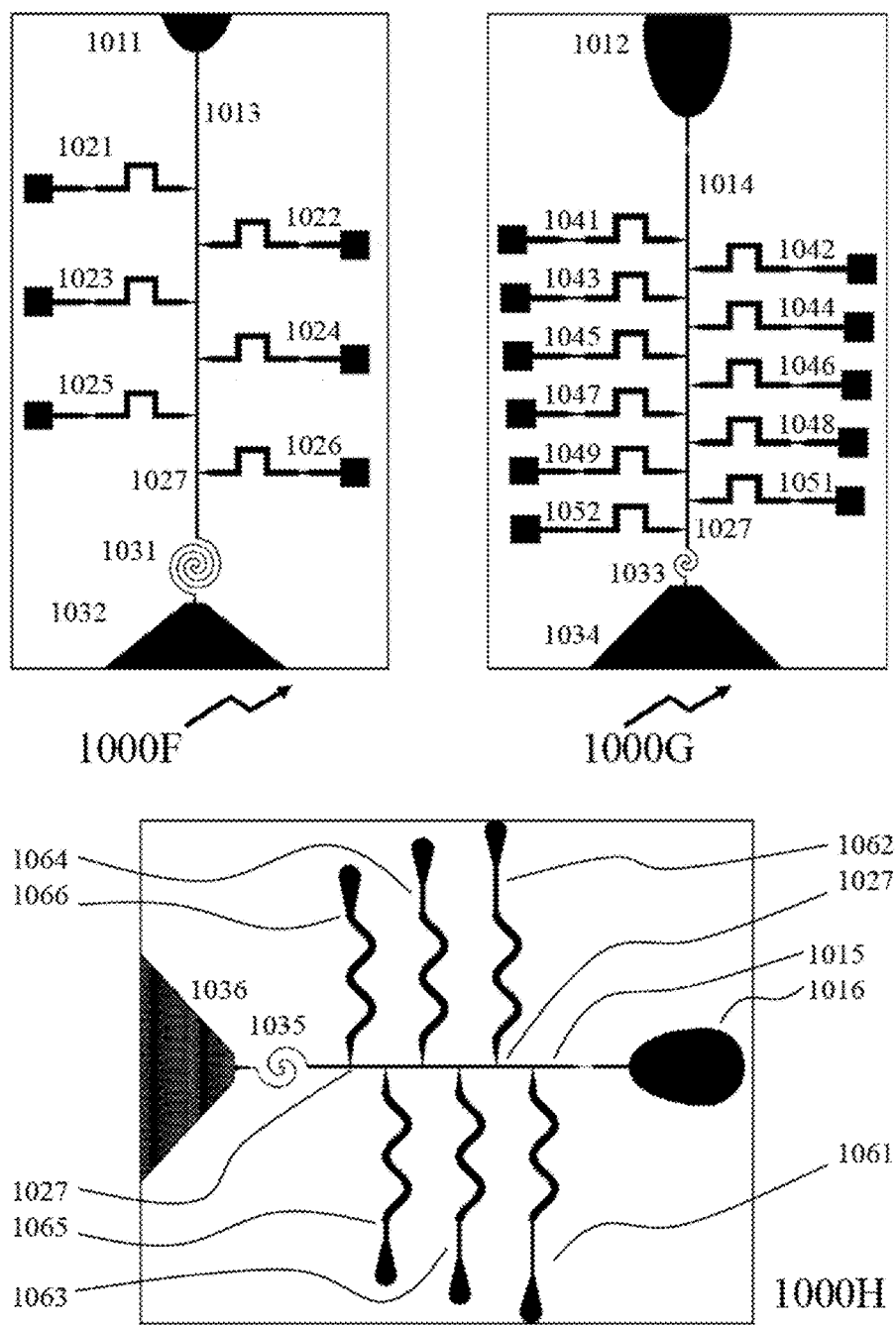
FIG. 10C depicts capillary retention valves of the prior art and advanced programmable capillary retention valves according to embodiments of the invention
Figure 10D:
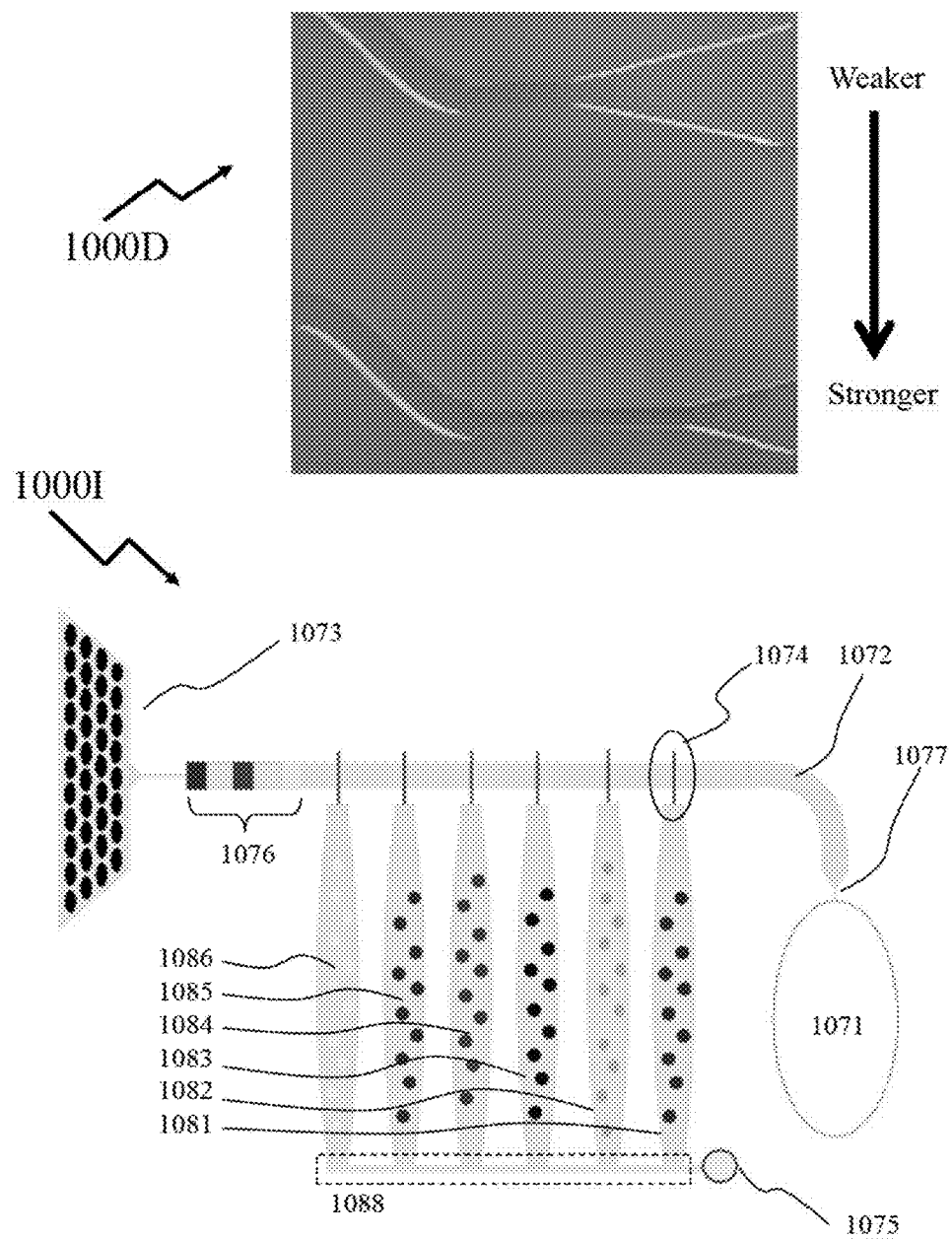
FIG. 10D depicts advanced programmable capillary retention valves according to embodiments of the invention and their use in a six step sequential release of fluids within a microfluidic circuit.

Referring to FIG. 10D in micrograph 1000D fabricated pCRVs (pRBVs) are depicted which have low and high pressure "burst" pressure values as discussed in respect of FIG. 10C above. Also depicted within FIG. 10D is a variant of the MICFLICs discussed supra in respect of multiple pRBVs and sequential triggering. As shown in the sketched circuit as single vent circuit 1000I wherein a reaction chamber 1076 and retention valve 1077 are disposed within a conduit 1072 disposed between a filling port 1071 and capillary pump 1073. Coupled to the conduit 1072 are trigger valves 1074 coupling to first to sixth reservoirs 1081 and 1086 respectively wherein all reservoirs are coupled to a single vent 1075 unlike prior embodiments of MICFLICs described within this specification wherein each reservoir couples to discrete vent. The reservoirs are coupled to single vent 1075 via a programmable retention valve 1088. In operation single vent circuit 1000I may for example be operated as follows:

introduce a buffer solution onto the side conduits;
buffer solution rehydrates dehydrated reagents stored within the first to sixth reservoirs 1081 through 1086 respectively;
flow stops at the end of each of the first to sixth reservoirs 1081 through 1086 respectively through trigger valves 1074;
analyte is loaded to the filling port 1071;
analyte passes the reaction chamber 1076; and
once filling port 1071 empties the first to sixth reservoirs 1081 through 1086 are drained sequentially from first reservoir 1081 to sixth reservoir 1086.

In operation as the side conduits at the other end of the reservoirs from conduit 1072 are connected to the programmable retention valve (pRBV) 1088 then this controls the draining sequence of the reservoirs. As discussed supra in respect of FIG. 10C and third schematic 1000H the pRBVs have reducing width and increasing length for reliable retention and bursting operation. Accordingly, it would be evident that controlling the dimensions of the pRBV 1088 and length of the pRBV 1088 traversed from each of first to sixth reservoirs 1081 through 1086 respectively allowing the retention pressure to increase for each. Accordingly, it would be evident to one skilled in the art that this programmable retention burst valve allows a large number of conduits (reservoirs) to be drained sequentially without the requirement to adjust the pRBV burst pressure sequence such as discussed above in respect of FIG. 10C due to characteristics and/or aspects of the specific MICFLIC.

Figure 10E:
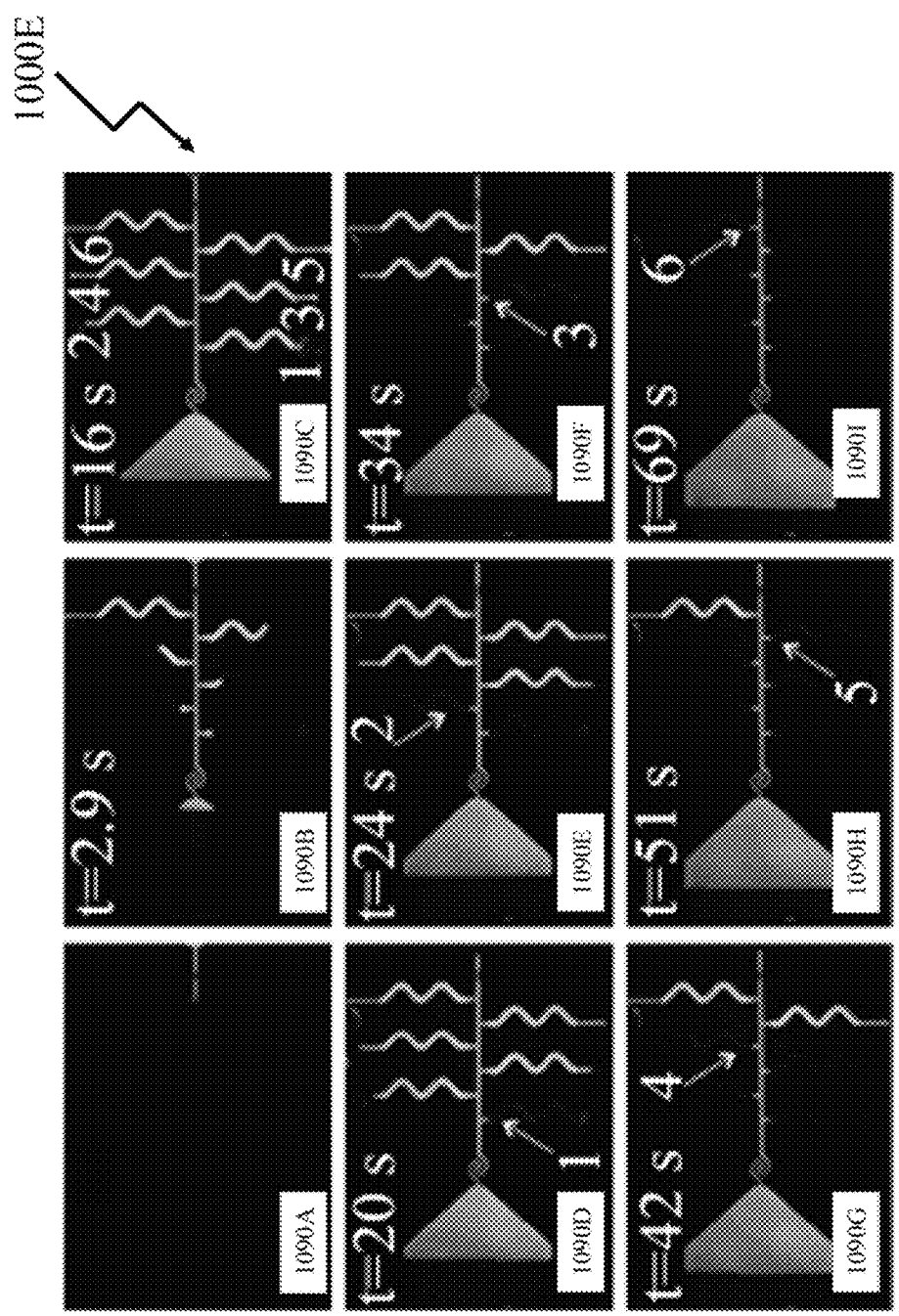
FIG. 10E depicts advanced programmable capillary retention valves according to embodiments of the invention and their use in a six step sequential release of fluids within a microfluidic circuit.

Also depicted in FIG. 10E are video image sequence 1000E are first to ninth images taken from operation of a MICFLIC, such as MICFLIC 1080, wherein the circuit initially fills 6 channels, each with a pCRV (pRBV) between the channel and vent (not shown for clarity) and then drains them into a capillary pump on the left hand side. Accordingly the sequence depicted comprises:

t=0 s fluid begins to be drawn into MICFLIC within region being imaged;
t=2.9 s retention channel #6 filled and others beginning;
t=16 s all 6 retention channels filled;
t=20 s #1 channel drained;
t=24 s #2 channel drained;
t=34 s #3 channel drained;
t=42 s #4 channel drained;
t=51 s #5 channel drained;
t=69 s #6 channel drained.

Accordingly, pCRVs (pRBVs) according to embodiments of the invention may be placed at the end of the respective channel close to the vent as they drain completely rather than being pinned as with prior art CRVs which would require them to be formed close to the main fluidic channel in order to minimise volume of fluid retained and held through the pinning process.

Within the prior art microfluidic solutions fluidic flow within a microfluidic channel (conduit) is unidirectional. However, in many MICFLIC circuits for POC devices it would be beneficial to be able to reverse the flow within a single channel, multiple channels, or a predetermined portion of a MICFLIC. Now referring to FIG. 11 there is depicted a MICFLIC 1100A according to an embodiment of the invention wherein process flow is reversed within the circuit portion 1100M. As depicted MICFLIC 1100A includes a radial flow resistor 1100D, reverse trigger 1100B, and flow router 1100C together with dual capillary pumps and spiral resistor which are not identified for clarity. Reverse trigger 1100B triggers microfluidic flow reversal within circuit portion 1100M.

Figure 11A:
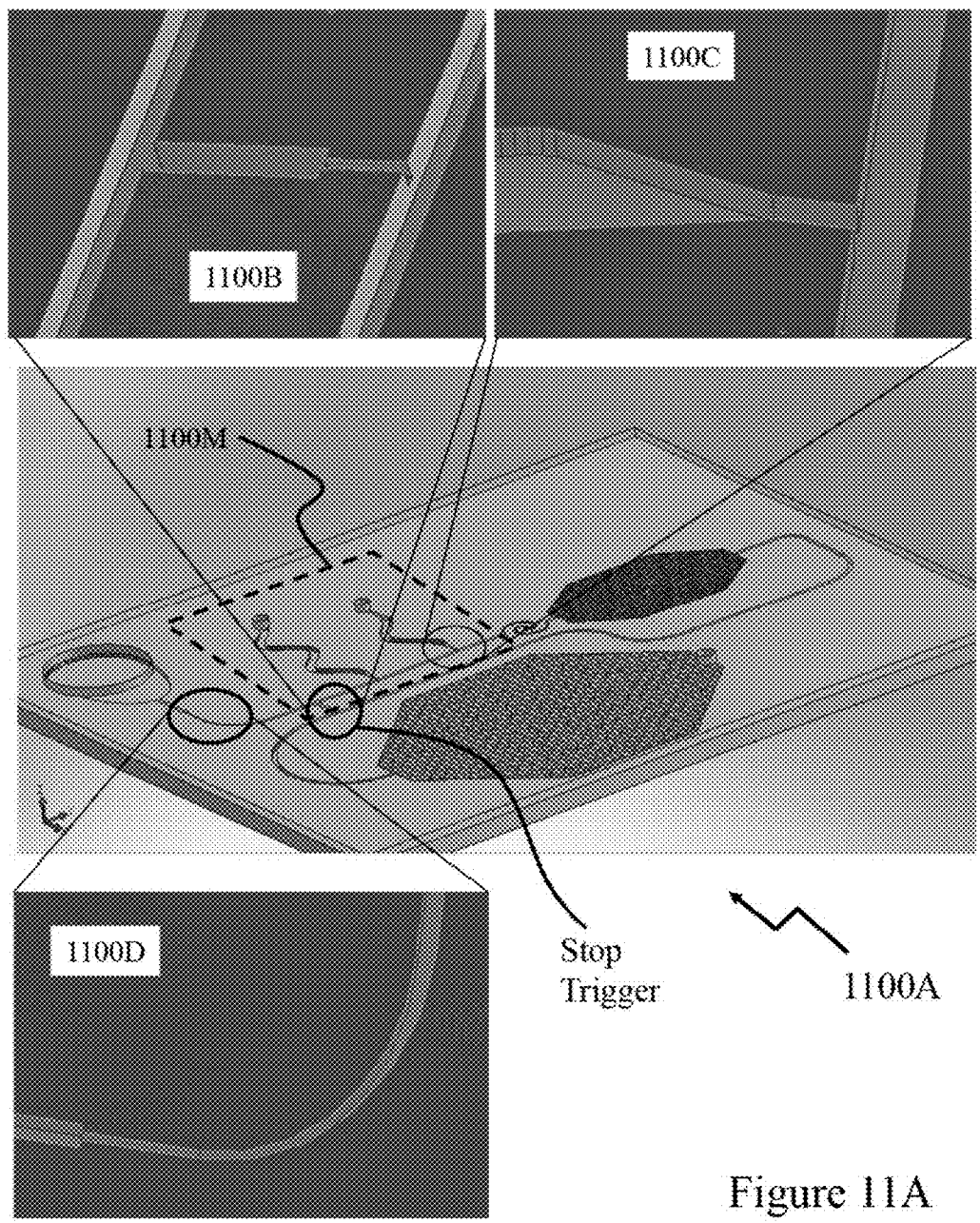
FIG. 11A depicts a stop trigger valve according to an embodiment of the invention.
Figure 11B:
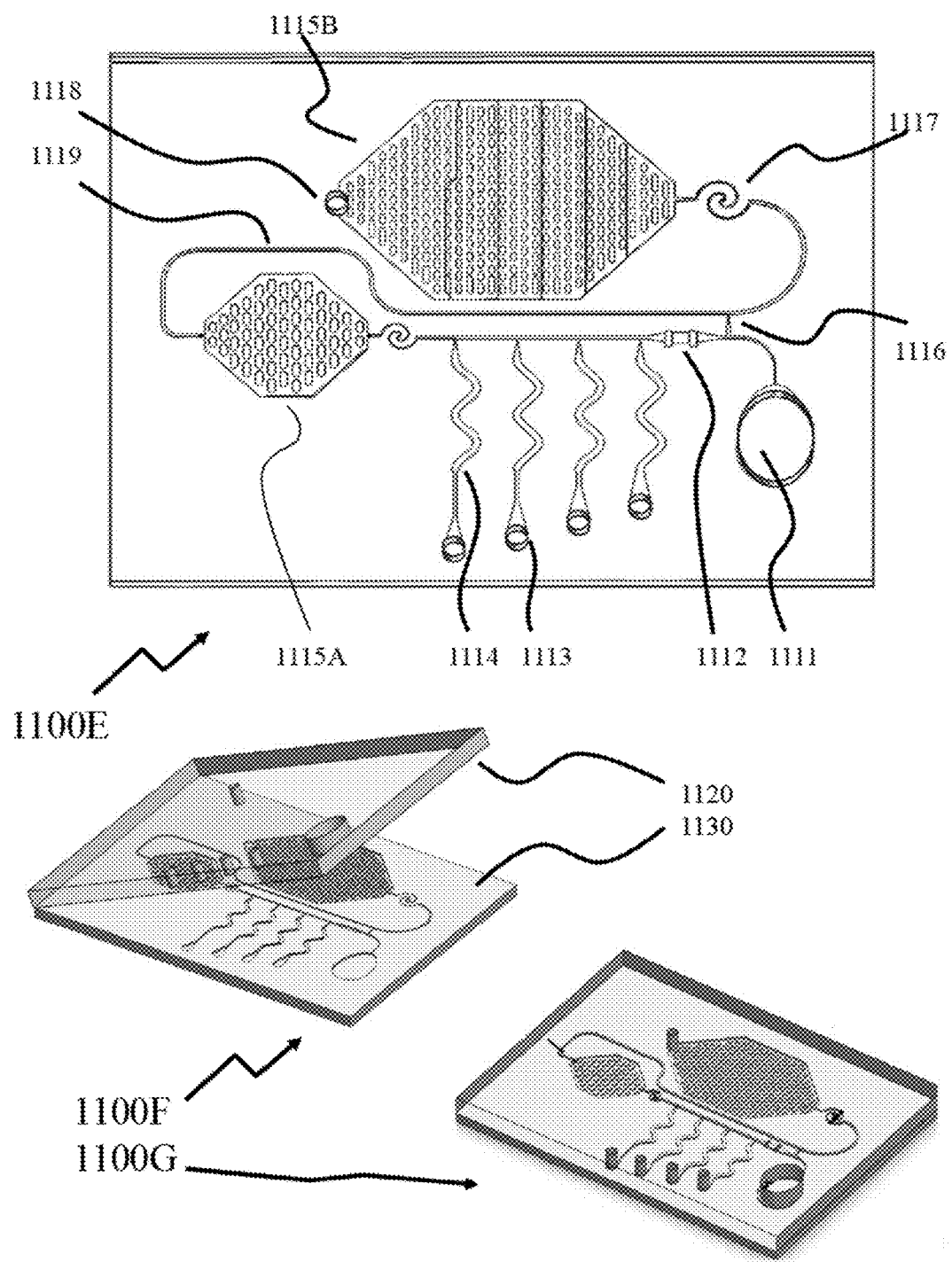
FIG. 11B depicts a microfluidic circuit employing microfluidic elements according to embodiments of the invention and its assembly methodology.

Now referring to FIG. 11B there is depicted MICFLIC 1100E of similar design to MICFLIC 1100A wherein a filler port 1111 is coupled to a detection zone 1112 wherein the main flow channel couples to four retention channels, not identified explicitly, wherein pCRVs such as first and second pCRVs 1113 and 114 are implemented to retain fluid within the retention channels of which they form part. In doing so the fluid fills the trigger channels within the capillary trigger valve (CTV) 1116. The sample fluid then flows into capillary pump 1115A which once filled couples to reverse channel 1119 wherein when it passes CTV 1116 it triggers it. Due to the pressure at the other side of CTV 1116 the fluids and/or reagents stored within the retention channels between detection zone 1112 and capillary pump 1115A now empty via the detection zone through CTV 1116 and are drawn under action of the waste pump 1115B.

Figure 12:
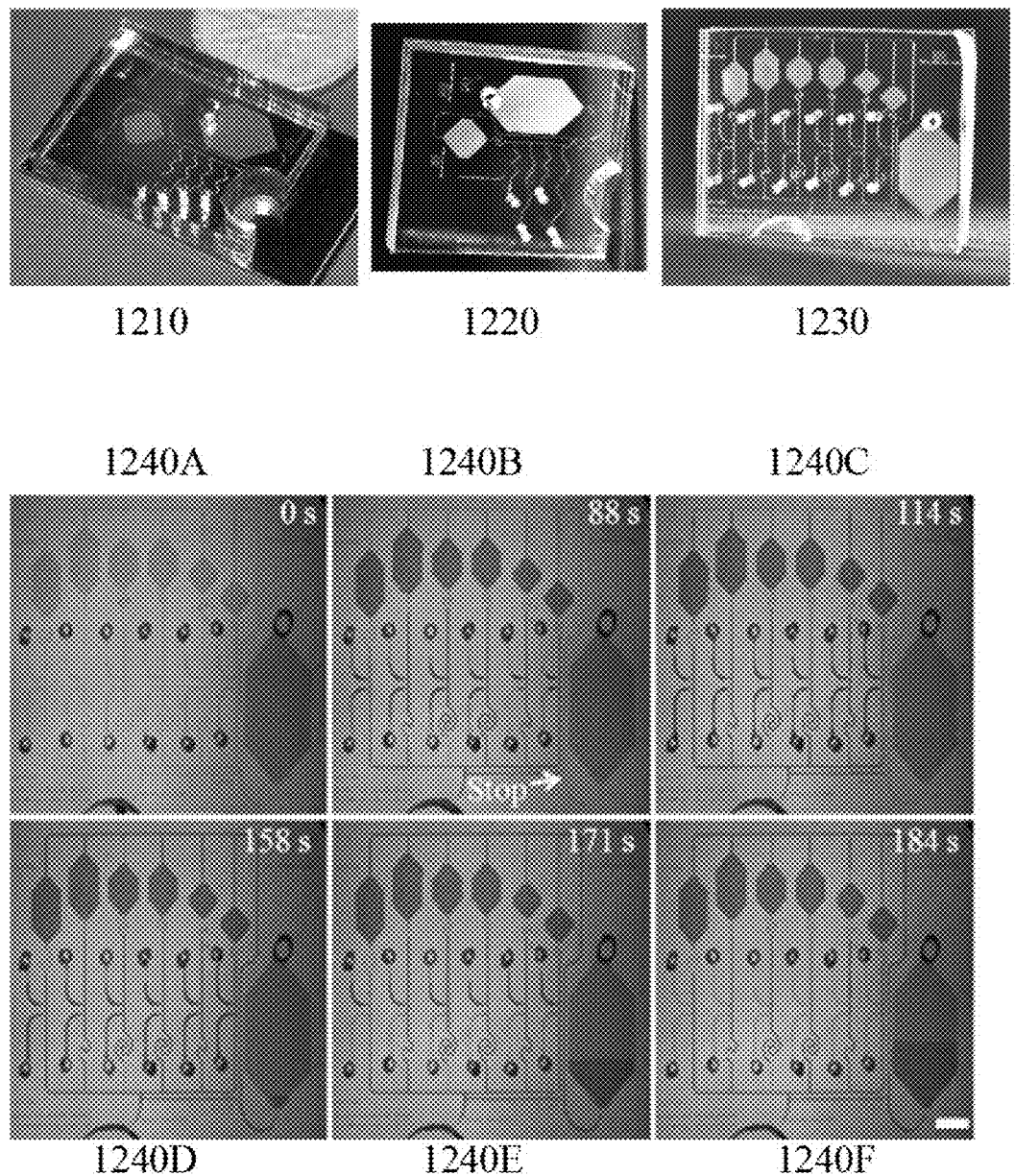
FIG. 12 depicts fabricated microfluidic circuits employing microfluidic elements according to embodiments of the invention wherein the microfluidic circuits are formed through micromachining and molding.

Referring to first and second schematics 1100F and 1100G the assembly of MICFLIC 1100E is depicted wherein a cover 1120 with vent holes is disposed atop a substrate 1130 that contains the etched MICFLEL structures such as detection zone, retention channels, capillary pump, reverse channel, waste pump, and CTV. First and second fabricated MICFLICs 1210 and 1220 respectively in FIG. 12 depict embodiments of MICFLIC 1100A. First fabricated MIC-FLIC 1210 exploits a silicon substrate in conjunction with a polydimethylsiloxane (PDMS). An exemplary process flow for a silicon substrate providing MICFLELs is discussed below in respect of FIG. 16. Second fabricated MICFLIC 1220 exploits a PDMS substrate in conjunction with a PDMS cover. An exemplary process flow for a PDMS substrate is discussed below in respect of FIG. 17.

Figure 11C:
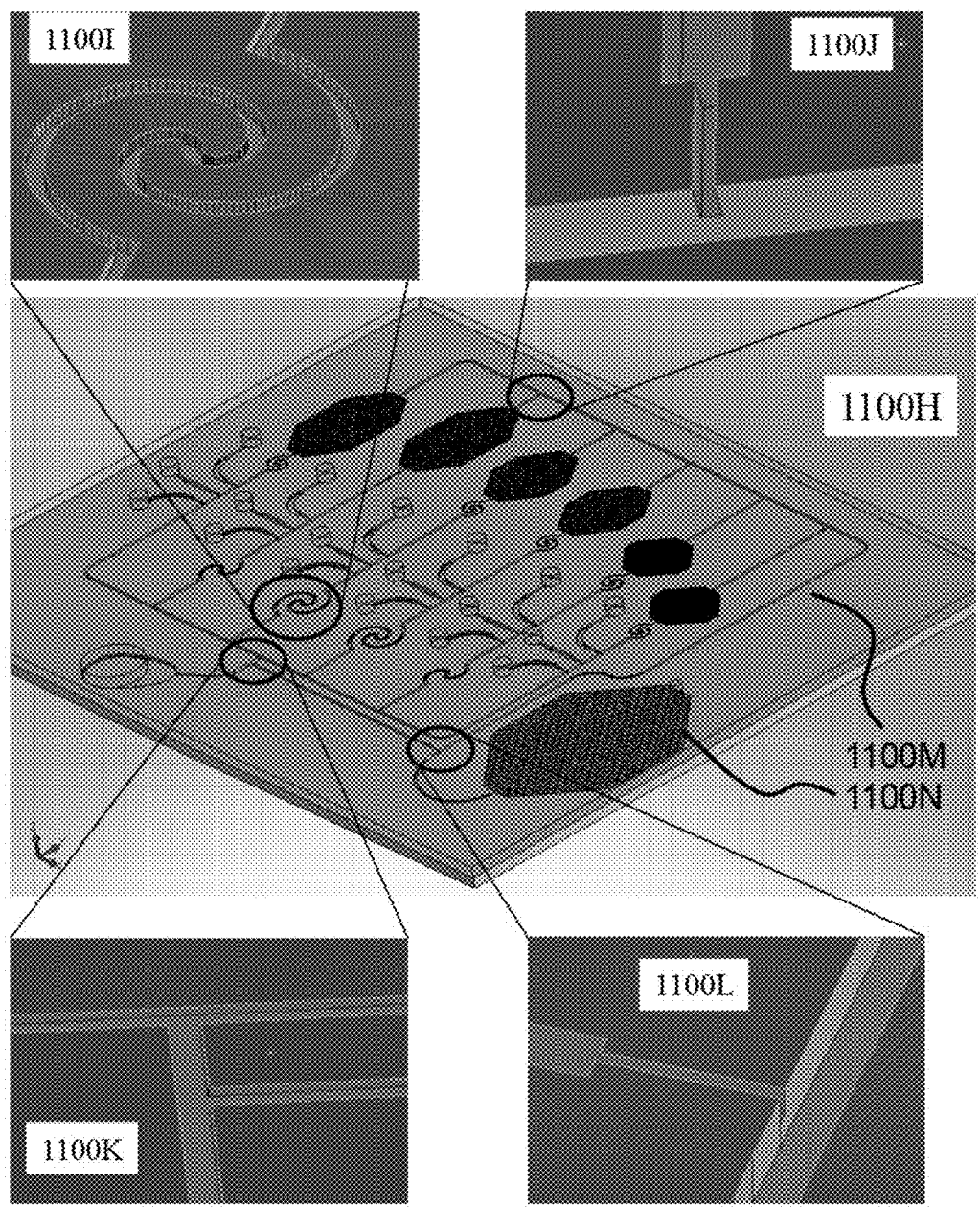
FIG. 11C depicts a microfluidic circuit employing microfluidic elements according to embodiments of the invention.
Figure 11D:
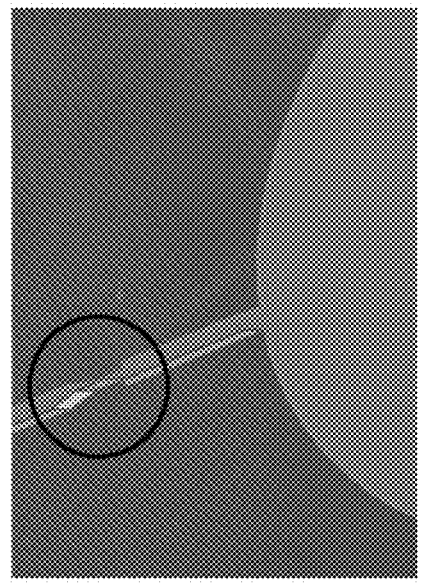
FIG. 11D depicts

Similarly referring to FIG. 11C a MICFLIC 1100H is depicted comprising spiral resistors 1110I, pCTVs 1100J, flow router 1100K, and CTV 1100L in conjunction with multiple capillary pumps, waste pump 1100M, delay channel 1100N, and retention channels. Accordingly, according to the design of pCTVs 1100) and CTV 1100L the circuit paths within MICFLIC 1100H may reverse once CTV 1100L is triggered. Third fabricated MICFLIC 1230 in FIG. 12 implements the circuit of MICFLIC 1110H exploiting a PDMS substrate in conjunction with a PDMS cover. FIG. 11D depicts a CRV implemented in the load portion of a MICFLIC wherein the portion of the circular element depicted represents the filling port and the encircled MIC-FLEL the CRV within the loading channel. Such a configuration, for example, being depicted by CRV 1540 and filling port 1530 in FIG. 15 for a Laser Scanning Cytometry. Also depicted within FIG. 12 are first to sixth still images 1240A through 1240F respectively which depict the operation of the MICFLIC 1230, i.e. the circuit of MICFLIC 1110H. First to sixth still images 1240A through 1240F respectively being taken as 0 s, 88 s, 114 s, 158 s, 171 s, and 184 s respectively during operation of the MICFLIC 1230. Accordingly at t=0 s the circuit is empty but with the addition of fluid to the filling port the multiple parallel paths begin to fill, shown in second still image 1240B at t=88 s, with the CTV 1100L stopping flow of the fluid to the large waste pump 1100M. Subsequently, in third image 1240C at t=114 s all six channels are now filled together with their respective capillary pumps, reservoirs, wherein the fluid from the leftmost capillary pump now flows into delay channel 1100N across the top of the chip triggering the CTVs at the end of each wherein as delay channel 1100N fills to the CTV 1100L it is similarly triggered such that in fourth still image 1240D at t=158 s the waste pump 1100M begins to fill and begins draining sequentially the multiple circuits. This is evident in fifth and sixth still images 1240E and 1240F respectively from the increasing presence of lighter channels (clear of fluid) to those still containing fluid (dark channels) within the lower portion of the circuit as the waste pump 1110L fills.

Figure 13:
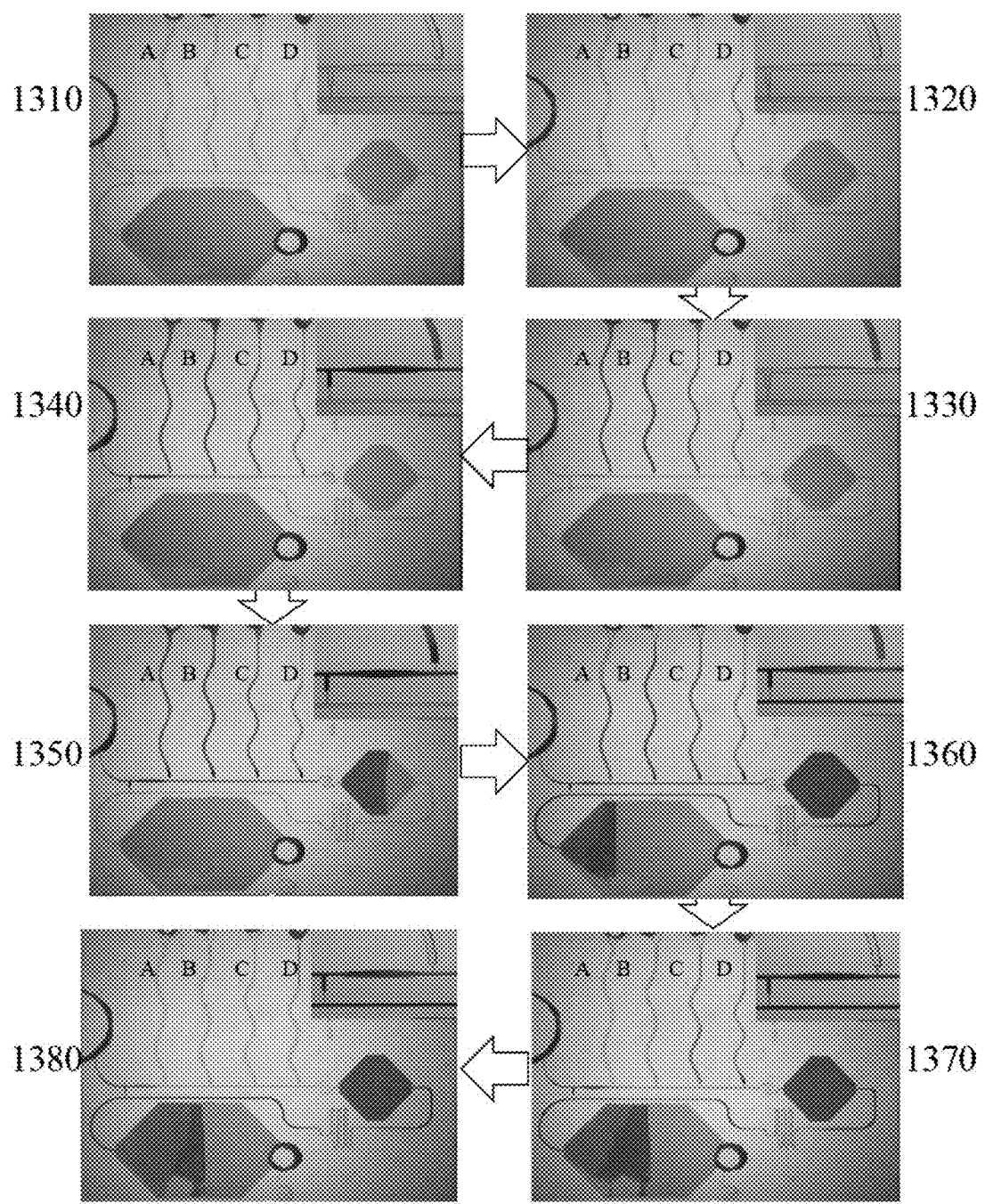
FIG. 13 depicts video frame images of a microfluidic circuit employing microfluidic elements according to an embodiment of the invention showing sequential triggering of advanced programmable capillary retention valves.

Referring to FIG. 13 first to eighth still images 1310 to 1380 respectively represent time lapsed images of a MIC-FLIC such as depicted in respect of MICFLIC 1100E in FIG. 11B and first and second fabricated MICFLICs 1210 and 1220 respectively in FIG. 12. These still images being:

1310 MICFLIC prepared ready for reagent addition;
1320 first reagent added to channel D;
1330 all four reagents added to retention channels A through D;
1340 fluid sample added to filler port;
1350 fluid samples passes retention channels and begins filling capillary pump;
1360 fluid sample passed capillary pump and CTV thereby triggering reverse flow;
1370 fluid channels A, B drained and fluid channel C partially drained via reverse flow through CTV; and
1380 all four channels A through D drained.

Figure 14:
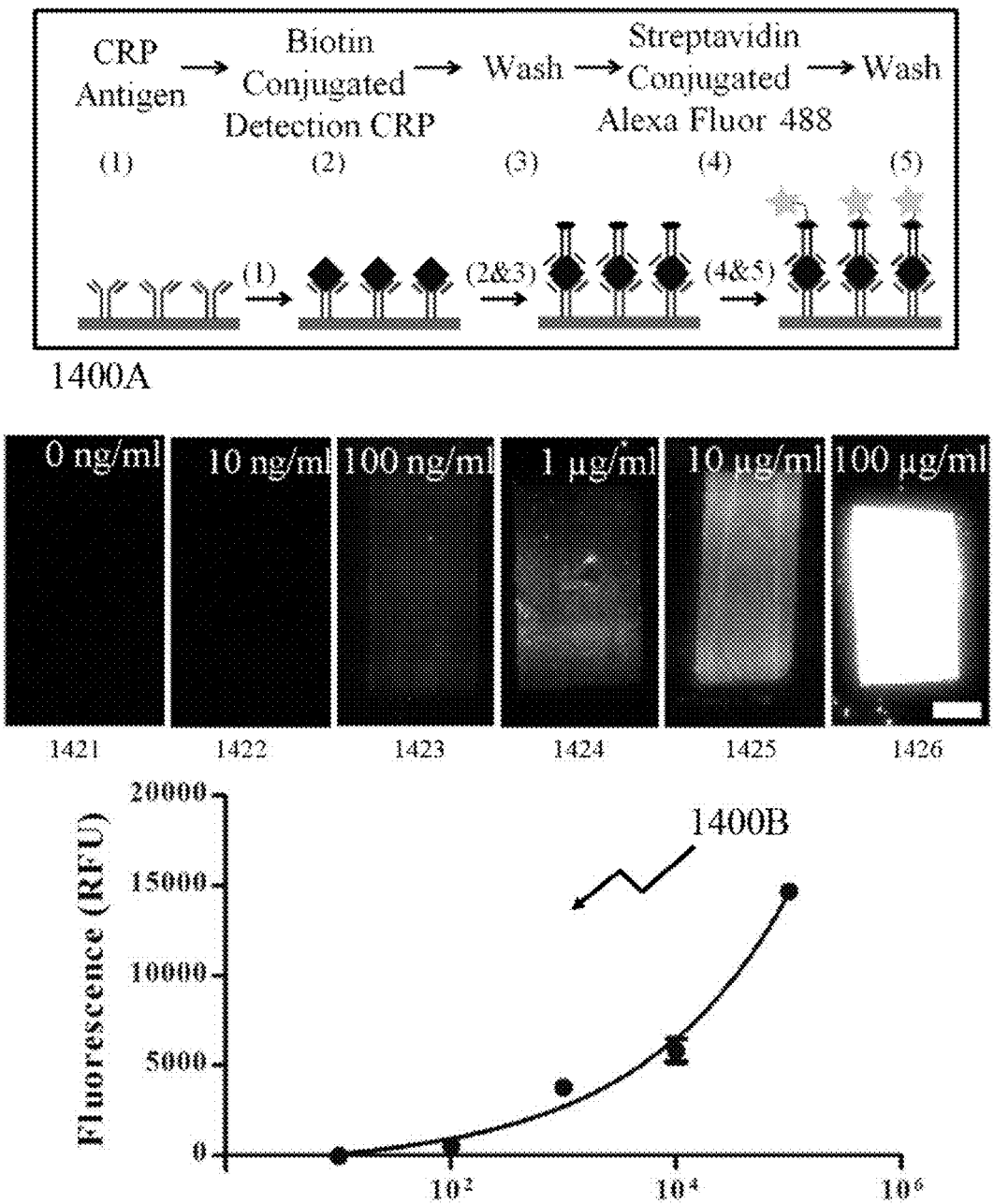
FIG. 14 depicts the application of a microfluidic circuit employing microfluidic elements according to an embodiment of the invention for detection of anti-C-reactive protein (CRP)

Referring to FIG. 14 there is depicted an assay sequence 1400A for detection of the C-reactive (CRP) antigen, wherein CRP has been associated with prostate cancer in men. A depicted assay consists of five steps. First the CRP antigen is captured and immobilized. Subsequently, biotinylated detected CRP is washed with buffer. Next fluorescent streptavidin and second washing buffer are flushed from the side channels sequentially. Finally the region is imaged with a fluorescent microscope leading to first through sixth fluorescent micrographs 1421 to 1426 respectively corresponding to various concentrations of CRP antigen at 00 ng/ml, 10 ng/ml, 100 ng/ml, 1 µg/ml, 10 µg/ml, and 100µ/ml respectively. The bar marker in sixth fluorescent micrograph 1426 is 50 µm. Referring to graph 1400B measurement data from three independent experimental sets, each comprising six MICFLICs, is presented wherein two patterned reaction zones were provided in each MICFLIC together with a fitted curve to the data.

Figure 15:
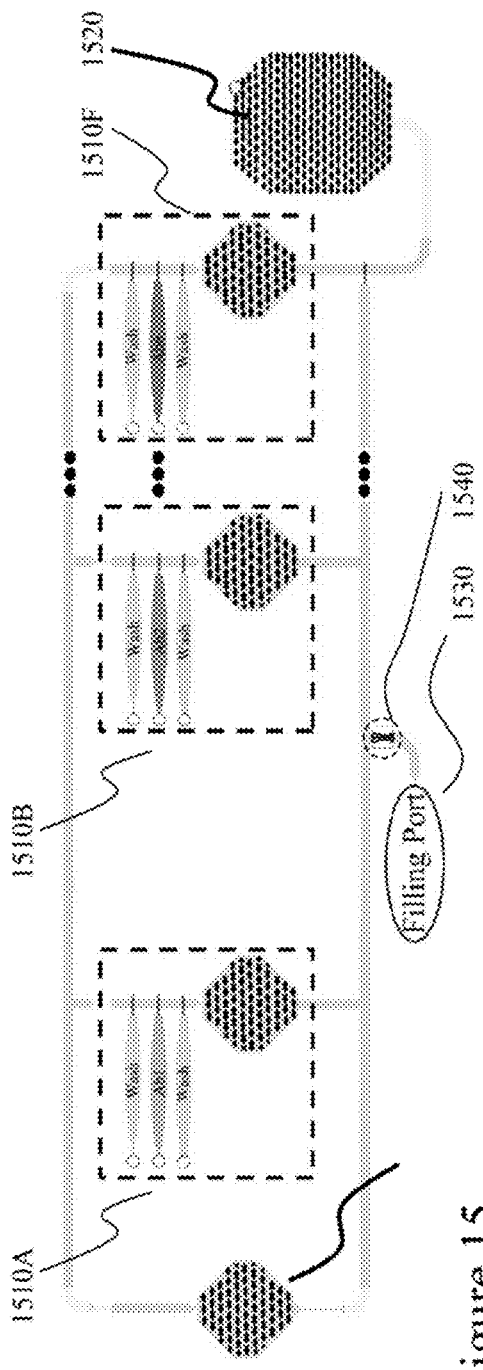
FIG. 15 depicts a microfluidic circuit employing microfluidic elements according to an embodiment of the invention for multi-agent detection.

Referring to FIG. 15 there is depicted a schematic of a MICFLIC for Laser Scanning Cytometry circuit wherein the method allows measurements of antigen content of cells. Accordingly, the capillary pumps within each of the parallel channels 1510A through 1510F are intended to hold the cells for subsequent laser scanning whereas the drive pump 1520 acts as a timing pump, and allows the cells to be seeded onto each of the parallel channel capillary pumps. After the cells are captured within the capillary pumps within the parallel channels 1510A through 1510F there is a wash step followed by flowing the multiple antibodies, denoted by Ab1, Ab2, through to Abn, over the cells and a final wash step. These multiple parallel sequences being controlled by the drive pump 1520. Accordingly, a single sample provided to the filling port 1530 is distributed to all channels which are driven through a combination of their discrete capillary pumps and the drive pump 1520. It would be evident that via appropriate design of the MICFLIC and its materials that the MICFLIC for Laser Scanning Cytometry may be designed for direct mounting into a cytometer.

Figure 16:
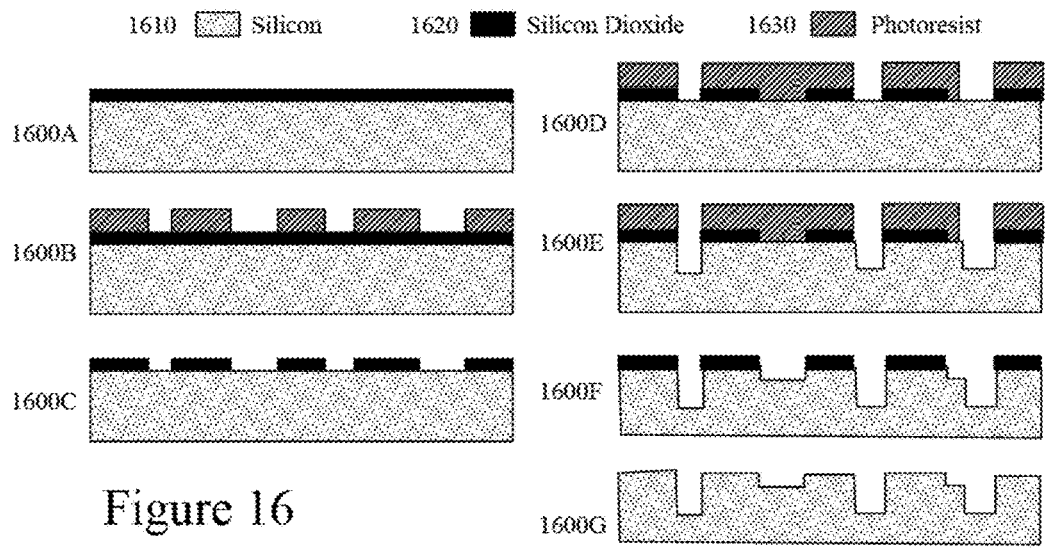
FIG. 16 depicts a manufacturing methodology for the formation of microfluidic circuits and/or microfluidic elements according to embodiment of the invention with chemical micromachining of silicon.

Referring to FIG. 16 there is depicted an exemplary process flow for manufacturing a silicon substrate for use in combination with a PDMS cover for example to provide a MICFLIC wherein the MICFLELs are primarily implemented within the silicon substrate. Accordingly the process begins at step 1600A wherein a silicon (Si) substrate 1610 is coated with a layer of silicon dioxide ($SiO_2$) 1620 which may be for example thermally grown or deposited. Next in step 1600B a layer of photoresist is deposited and patterned through a lithography process such that in step 1600C the $SiO_2$ 1620 is etched. Next in step 1600D a further photolithography process employing photoresist 1630 is undertaken. The openings within the photoresist 1630 are etched in step 1600E resulting in etched channels within the Si substrate 1610 to a first predetermined depth. Next the photoresist 1630 is removed and a second etching process is undertaken in step 1600F resulting in the continued etching of the initial openings but now also the openings within the $SiO_2$ 1620 defined in step 1600C. The $SiO_2$ 1620 mask is then removed in step 1600F resulting in finished Si substrate 1610 in 1600G. The finished Si substrate 1610 may then be subsequently exposed to additional processing such as plasma processing for example to provide hydrophilic regions whilst other regions may be treated with other materials to form hydrophobic regions, metallization, electrodes, etc for example. Accordingly, dual depth microfluidic elements are formed within the Si substrate 1610 which are subsequently encapsulated with a cover, such as one implemented in PDMS for example or another silicon substrate.

Figure 17:
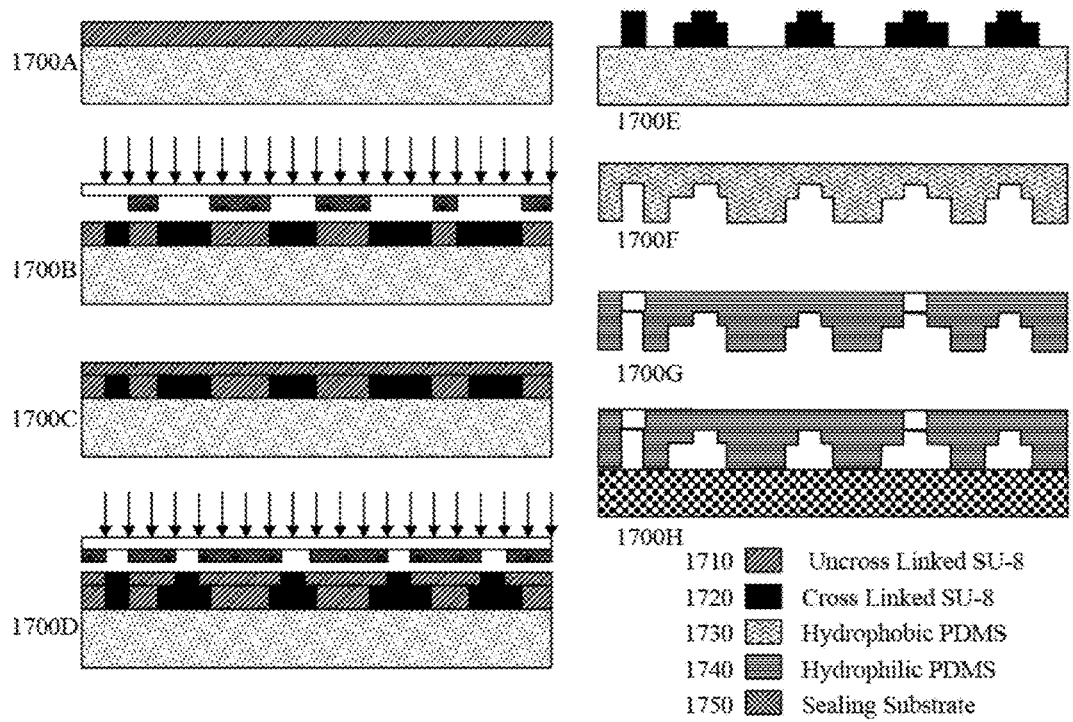
FIG. 17 depicts a manufacturing methodology for the formation of microfluidic circuits and/or microfluidic elements according to embodiment of the invention with a PDMS molding process.

Referring to FIG. 17 an exemplary process flow for a PDMS based MICFLIC is presented. In first step 1700A an uncrosslinked SU-8 layer 1710 is deposited upon a substrate. Next in step 1700B this uncrosslinked SU-8 layer 1710 is exposed through optical lithography defining crosslinked SU-8 regions 1720. This process is repeated in steps 1700C and 1700D to provide two layers of cross-linked SU-8. SU-8 being an epoxy-based negative photoresist that is very viscous polymer and can be spun over thicknesses ranging from <1 µm up to >300 µm and still be processed with standard contact lithography. The uncrosslinked SU-8 material is removed in step 1700E wherein the resulting crosslinked SU-8 1720 forms the basis for a molding of hydrophobic PDMS 1730 which may be spun or poured to form the molded element. Next in step 1700F the hydrophobic PDMS 1730 is processed to provide hydrophilic PDMS 1740 and vent holes are formed. Next in step 1700G a sealing substrate 1750 is attached to form the MICFLIC. Optionally, the vent holes may be implemented within the sealing substrate 1750.

Figure 18:
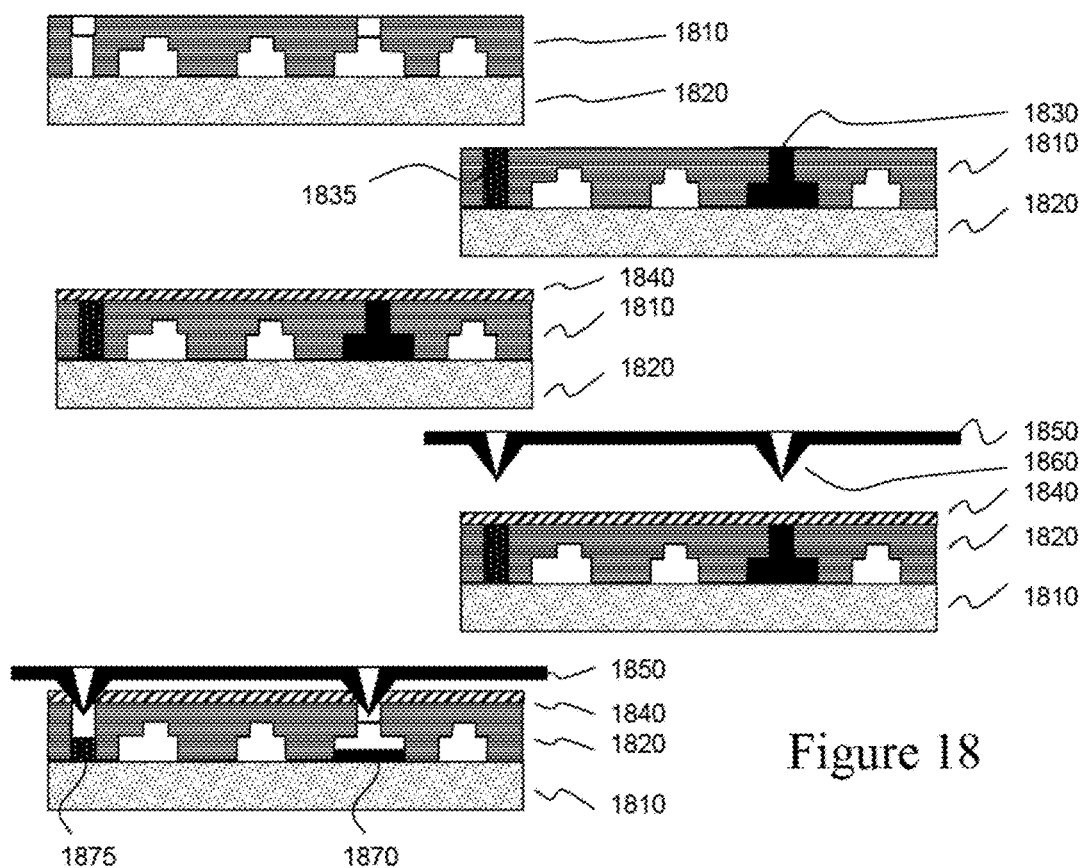
FIG. 18 depicts an initialization process for pre-filled microfluidic circuits and/or microfluidic elements according to an embodiment of the invention.

Referring to FIG. 18 an exemplary process flow for activating a MICFLIC according to an embodiment of the invention is described wherein the MICFLIC is a single use assay inserted into a POC device which provides the interfaces, electronics, logic, display etc such as described above in respect of FIG. 2A for example. It would be evident to one skilled in the art that where a MICFLIC requires multiple washes, buffer solutions, reagents, antibodies etc that providing these at the time of use of the POC device detracts from the benefits of self-powered self-regulating MICFLICs in some applications such as consumer driven measurements. Accordingly it would be beneficial to pre-fill such reservoirs and channels prior to shipment of the MICFLIC and its attendant POC. However, as multiple vents are implemented within the MICFLIC assembly such fluid elements may become contaminated, subject to evaporation, or even leak.

In the exemplary process flow in FIG. 18 a MICFLIC comprising cover 1810 and substrate 1820 is filled with the required reagents etc as depicted by first and second reagents 1830 and 1835 respectively. The filled MICFLIC is then sealed with a coating 1840 wherein it may be stored, shipped and held ready for deployment. When inserted into the POC device a cover plate 1850 with hollow projections 1860 is brought down into contact with the MICFLIC piercing the coating 1840 such that the vents are now opened to air. Optionally, low temperature waxes or other materials may be employed to seal vents wherein a thermal processing step opens the vents. It would be evident that other approaches may be evident to one skilled in the art including the use of mechanical and electrically activated valves etc.

Within the descriptions presented above in respect of FIG. 3 and FIGS. 5B through 18 respectively the primary consideration has been to the implementation of novel capillary pumps, CRVs, pCRVs, CTVs, pCTVs, and flow resistors as well as provisioning reversible fluid flow within the MICFLIC. However, other extensions and enhancements may be implemented atop these underlying physical microfluidic elements.

Figure 19:
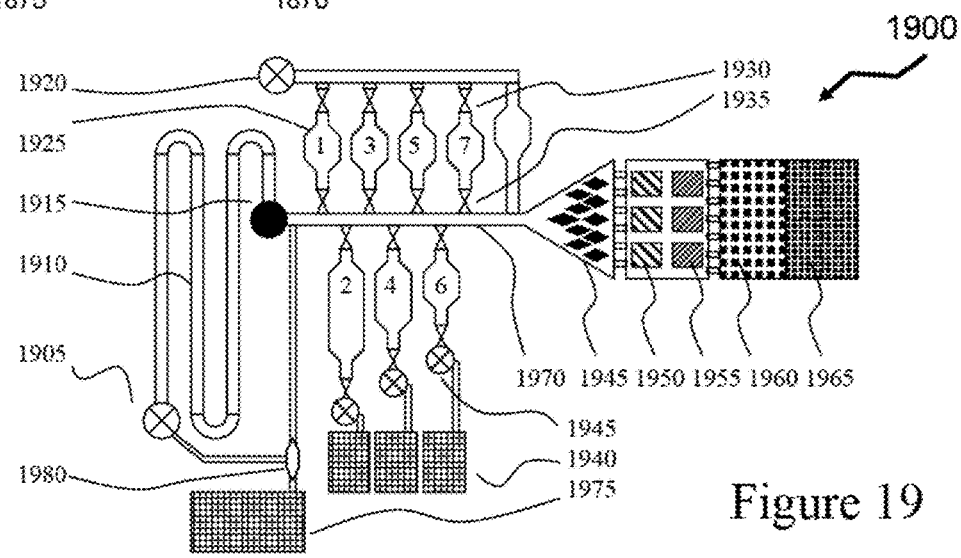
FIG. 19 depicts the application of a microfluidic circuit employing microfluidic elements according to an embodiment of the invention for bacterial capture with positive and negative control elements.

Bacterial Capture Array. Bacterial capture may be undertaken using post arrays and other micromachined structures such as described and referenced above in respect of CTCs wherein the post spacing, or other aspects of the micromachined device are adjusted for the specific bacteria of interest. Such a MICFLIC 1900 is depicted in respect of FIG. 19 wherein a sample inlet 1905 receives a sample to be processed and couples the sample initially through an aliquoting reservoir 1910 which couples via resistor/CRV assembly 1915 to flow router 1945 via capillary 1970. From the flow router 1945 the sample is coupled to a control zone comprising positive and negative control zones 1950 and 1955 respectively. The overall fluid process being controlled via first and second capillary pumps 1960 and 1965 respectively. Linked to capillary 1970 are seven reservoirs 1925 with positive trigger valve/retention valve elements 1935 at the capillary 1970 end and programmable retention valves 1925 at their other end. In the case of the reservoirs 1925 marked 1, 3, 5, and 7 these control buffer fluid release which is introduced through buffer inlet 1920. For the other reservoirs 1925 marked 2, 4, 6 these are coupled to reagent inlets 1945. Each of these reservoirs 1925 marked 2, 4, 6 are also coupled to overflow capillary pumps 1940. Another capillary overflow pump 1975 is coupled to the sample inlet 1905 and aliquoting reservoir 1910 via trigger valve 1980.

Accordingly in operating MICFLIC 1900, for example for MICFLIC 1900, for example for multiple *staphylococcus aureus* strains then phages would be pre-spotted to colloidal arrays within the control zones and the MICFLIC 1900 covered. Subsequently, the buffer fluid would be introduced through buffer inlet 1920 thereby filling reservoirs 1925 marked 1, 3, 5, and 7. Next, biotinylated detection phage, enzyme gold-conjugate, and silver amplification solution are filled into MICFLIC 1900 through the reagent inlets 1945 to the reservoirs 1925 marked 2, 4, and 6 respectively. The capillary pumps 1940 and capillary overflow pump 1975 allow for accurate metering during the process. Accordingly, once the MICFLIC 1900 is ready a sample is introduced through sample inlet 1905 wherein it fills the serpentine reservoir 1910 before flowing through capillary 1970 to first capillary pump 1960 which produces a soft flow. Subsequently, the reservoirs 1925 are drained in sequence wherein flow rates may be adjusted through second capillary pump 1965 which is asymmetric. Accordingly for each strain of *staphylococcus aureus* a positive control zone 1950 and negative control zone 1955 are provided. Optionally, in the instance that multiple zones are provided and only a single *staphylococcus aureus* to be detected all zones may be spotted or only some.

Importantly, bacteria are found in the supernatant of buffer following centrifugation, and that there is no need to separate them from a large excess of other cells, which significantly relaxes the constraints on MICFLICs. Also, as an alternative to antibodies, phages may be used to bind bacteria. In some embodiments with bacteria capture a transparent MICFLIC may be employed (or one with a transparent window over the capture zone), such that given the large area of bacteria and the possibility for multiple binding of detection phages, a large number of silver spots would be produced and will coalesce into a "dark dot" visible with sufficient magnification.

Colloidal-Crystal Array. Self-assembled three dimensional colloidal arrays (3D-CA) formed within ~200 um deep microchannels may be formed. However, polystyrene beads may be used in similar approaches as may silica beads using sedimentation as the driving force for assembling the crystals. Such crystals may be sintered for polymers, or fixed by liquid phase silanation and the circuit sealed with a cover. The circle defined within the gaps of closely packed beads is ⅙ of the bead diameter corresponding to 3.3 um gaps for 20 um beads (see schematic). The optimal size may be identified using a variety of bead sizes but the colloidal crystals can be assembled allowing for detection using blood illumination and a CCD camera.

Negative and Positive Control. For validation and quantification of the signal, negative and positive control zones should be integrated into the MICFLIC sensor system. Positive control can be achieved, for example, by spotting biotinylated proteins adjacent to the bacteriophage capture zones. Further to facilitate visual recognition, they may be spotted so as to form a "−" sign that turns into a "+" sign if bacteria are detected, akin to the approach used for some pregnancy tests.

Quantification will be improved by controlling the concentration of positive control biotin, and serve as a guide to determine concentrations of bacteria. In addition, two schemes for negative controls may be exploited for example. The first involves spotting phages that do not target any bacteria of interest and thus a signal detected on these spots will be the result of non-specific binding to the phages. A second negative control can be established by injecting a buffer stream triggered by the sample flow along the edge of the detection area with replicate spots for all phages. A buffer stream may be programmed to stop simultaneously with the sample, and thus it will define areas with capture phages that were not incubated with sample, but with all other reagents.

Third Generation MICFLICs. These devices may be built at full capacity of 100 pl which is the volume collected using a swab applicator and all of which will be flowed through the bacterial capture area. To reduce the footprint of such devices, laser-cut nitrocellulose membranes for example may be embedded into laser-cut polymer cover plates and used as capillary pumps. Many membranes with different capillary pressures are available for the immunochromatograhic lateral flow strips and may be further tuned by chemical modification. Such membranes and cover plate may be bonded onto the bottom plate comprising the microfluidic channels and the bacterial capture zone.

Biological Amplification by Bacteriophages. Bacteriophage based biological amplification of a signal may be employed for ultra-high sensitivity. Captured bacteria may be infected by the phages, and depending on the phage, will serve to amplify the phages 100 fold over a time course of approximately 30-40 min. By maintaining a laminar flow during this period, the phages will be flushed downstream, where they will be capture by previously immobilized antibodies against the phages. Accordingly a 100 fold, highly specific amplification that only targets live bacteriophages is thus possible and despite potential test times of an hour such microfluidic circuits may serve as a validation in case of very low infectivity and results close to the limit of detection.

Microfluidic Circuit with ECL Electrodes. Using standard microfabrication techniques, Au electrodes may be patterned onto the microfluidic circuits according to embodiments of the invention and coated with Pt by electroplating for example. Such electrodes may be preferentially patterned on the flat cover, and the ECL detected using an inverted microscope from the bottom.

Pre-Stored Proteins within MICFLIC. Within the descriptions above in respect of embodiments of the invention multiple reagents may be employed within a MICFLIC as part of the processing executed with the self-powered programmatic microfluidic circuits. However, whilst the MICFLICs allows for low cost, disposable assay solutions they still require loading with the reagents and accordingly reagent storage within a MICFLIC would simplify assay automation, reduce user training requirements and improve assay reproducibility. Dehydration of the proteins, i.e. detection antibodies, and their rehydration is a common way to preserve reagents and accordingly within the prior art different protocols exist allowing them to be dehydrated whilst preventing their denaturing or generating non-specific bindings. Alternatively, freeze drying has been reported as a protocol to store the detection antibodies on the chip by Zimmerman, see Zimmerman1, and has been employed to store reagents for several months at 4° C., see Morales et al in "Freeze-Dried Formulation for Direct Tc-99m-Labeling ior-egf/r3 MAb: Additives, Biodistribution, and Stability" (Nuclear Medicine and Biology, Vol. 26, pp. 717-723).

Accordingly, reagents may be preloaded into MICFLICs, processed to freeze dry or dehydrate prior to encapsulation through a methodology such as described in respect of FIG. 18. It would also be evident that fluids for rehydration may therefore also be stored within the MICFLIC allowing autonomous processing without clinician or technician involvement which is particularly beneficial within POC and consumer applications. Alternatively, the cover plate 1850 may form part of an assembly coupling to a second element similarly having a coating applied, such as coating 1840. Accordingly, some hollow projections puncture coating 1840 on the MICFLIC and coating on the second element such that liquid reservoirs are coupled to the MICFLIC whilst others couple to vents within the second element if they are covered. Accordingly, two elements with a cover plate may be assembled into a clamping configuration such that they are brought into contact and the necessary vents and liquid reservoirs coupled such that for buffer fluid and other reagents may be added to the MICFLIC either discretely or in combination with a freeze drying, dehydration or other storage means for proteins, etc.

Patterning Capture and Detection Antibodies: In some assays it is necessary to pattern and immobilize capture antibodies (cAbs) on surfaces within the MICFLIC which are intended to form positive control zones In one approach a few nanoliters, for example 20-50 nl, of the cAbs may be directly spotted within the reaction chambers using a non-contact printing approach. As discussed supra these cAbs-loaded MICFLICs may then be freeze dried and stored. In another approach cAbs may be patterned to the cover of the MICFLIC rather than the substrate containing the microfluidic channels prior to assembly which may exploit a microfluidic network itself.

Such a process exploiting two microfluidic devices can be employed to pattern a few cAbs in each channel. Such microfluidic devices can be made either out of Si, PDMS, or molded PMMA for example, after which they may for example be reversibly bound to a PDMS substrate that will act as the cover. A first microfluidic device is mounted to the PDMS substrate and each channel is filled with the desired Antibody, which has been diluted in phosphate-buffered saline (PBS), and allowed to incubate on the surface for a predetermined time. Subsequently, the PDMS substrate may then be rinsed with PBS, dried with nitrogen and then separated from the first microfluidic device. At this point other parts of the PDMS substrate are protected by immersing the PDMS substrate in 10% bovine serum albumin (BSA) according to a predetermined protocol. Next the PDMS substrate is attached to the second microfluidic device in a manner that the strips of cAbs are perpendicular to the microchannels within the second microfluidic device. Accordingly, two-dimensional arrays may be formed with low complexity without requiring a spotting system allowing highly parallel formation as would be required in low cost and disposable applications.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments. Implementation of the techniques, blocks, steps and means described above may be done in various ways.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A microfluidic device for a self-powered microfluidic cicuit including a capillary pump operable to drive a fluid through the self-powered microfluidic circuit, the microfluidic device comprising:

a first microfluidic channel having a first predetermined width, a first predetermined depth, a first end coupled to a first predetermined portion of the microfluidic circuit, and a second distal end coupled to a first end of a third microfluidic channel;

a second microfluidic channel having a second predetermined width over a predetermined section of the second microfluidic channel, a second predetermined depth, a first end coupled to a second end of the third microfluidic channel, and a second distal end coupled to a second predetermined portion of the microfluidic circuit;

the third microfluidic channel disposed between the first and second microfluidic channels, the third microfluidic channel having a third predetermined width and a third predetermined depth;

a cover over the first, second, and third microfluidic channels, the cover comprising a hydrophobic coating on a predetermined region of the cover adjacent the first, second, and third microfluidic channels, the predetermined region comprising at least where the third microfluidic channel intersects the first microfluidic channel;

wherein at least one of the second predetermined width and the second predetermined depth of the second microfluidic channel is selected to establish a predetermined retention pressure for the microfludic device composed of the combination of the first, second, and third microfluidic channels; and wherein the fluid fed into the first microfluidic channel from the self-powered microfluidic circuit flows by capillary action into the second and third microfluidic channels and is retained therein provided a pressure within the first microfluidic channel, generated by the capillary pump the self-powered microfluidic circuit, is less than the predetermined retention pressure, and wherein when the pressure within the first microfluidic channel exceeds the predetermined retention pressure, the fluid is burst released out of the first end of the second microfluidic channel, through the third microfluidic channel, and into the first microfluidic channel for draining back into the self-powered microfluidic circuit, thereby draining the fluid from the first, second, and third microfluidic channels simultaneously without the fluid being trapped within the third microfluidic channel.

2. The device of claim 1, wherein
the second microfluidic channel has an axis orientated at a first predetermined angle relative to a sidewall of the first microfluidic channel; and the third predetermined depth of the third microfluidic channel being less than the second predetermined depth of the second microfluidic channel, the third microfluidic channel having an axis orientated at a second predetermined angle relative to the first predetermined angle of the first microfluidic channel.

3. The device of claim 1, further comprising a cover over the first, second, and third microfluidic channels, the cover comprising a recess situated above the first microfluidic channel such that a sidewall of the recess acts to extend a sidewall of the first microfluidic channel such that the third microfluidic circuit opens essentially into a planar surface.

4. The device of claim 1, wherein the aspect ratio of each of the first, second, and third microfluidic channels is less than 2:1.

5. The device of claim 1, wherein the aspect ratio of each of the first, second, and third microfluidic channels is less than 3:1.

6. The device of claim 1, wherein the aspect ratio of each of the first, second, and third microfluidic channels is less than 5:1.

7. The device of claim 1, wherein the microfluidic circuit includes a microfluidic element in fluid communication with at least one of the first, second and third microfluidic channels, the microfluidic element further comprising: a first predetermined region including a recess comprising a plurality of posts disposed in a plurality of rows of first predetermined spacing between adjacent rows, second predetermined spacing between adjacent posts within a row, and having a first predetermined angle with respect to an axis of an inlet to the microfluidic element.

8. The device of claim 7, wherein the first and second predetermined spacing and the dimensions of the posts are such that fluid flow from the inlet to an outlet of the microfluidic element occurs primarily along the gaps between adjacent rows of posts rather than between the gaps of adjacent posts within each row.

9. The device of claim 7, wherein the plurality of posts are disposed so that between the plurality of posts and the sidewalls of the recess are open effective channels around the periphery of the recess, each channel having a predetermined width determined in dependence upon establishing predetermined pressure differentials between fluid within each channel and fluid within the region comprising the plurality of posts.

10. The device of claim 9, wherein a first pressure differential between fluid within adjacent rows is higher than a second pressure differential between fluid within a first channel combination leading from the inlet to the outlet and the second pressure differential is higher than a third pressure differential between fluid within a second channel combination leading from the inlet to the outlet, the second channel combination not including channels within the first channel combination.

11. The device of claim 1, further comprising a trigger valve, the trigger valve fluidly coupling the first microfluidic channel and a main fluid channel of the self-powered microfluidic circuit, the trigger valve retaining the fluid within the first microfluidic channel until a second fluid fills the main fluid channel.

12. The device of claim 1, wherein the second microfluidic channel includes a tapering portion having a tapering width along a length of the tapering portion at the first end of the second microfluidic channel, the tapering portion extending between the section of the second microfluidic channel and the third microfluidic channel to provide a fluidicly smooth transition therebetween.

13. The device of claim 1, wherein a transition between the third width of the third microfluidic channel and the first width of the first microfluidic channel is fluidicly abrupt.

14. The device of claim 1, wherein the second width of the second microfluidic channel is greater than the first width of the first microfluidic channel.

15. The device of claim 1, wherein at least one of the third width and the third depth of the third microfluidic channel is greater than the first width and the first depth, respectively, of the first microfluidic channel.

16. A microfluidic device for a self-powered microfluidic circuit including a capillary pump operable to generate a pump capillary pressure to drive a fluid through at least a main fluid channel of the self-powered microfluidic circuit, the microfluidic device comprising:

first, second and third microfluidic channels in serial fluid flow communication and integrally formed with one another, the third microfluidic channel being disposed between the first and second microfluidic channels;

the first microfluidic channel having an first end adapted to communicate with the main fluid channel of the microfluidic circuit such as to receive the fluid therefrom and/or transmit the fluid thereto, a second opposed end of the first microfluidic channel end being connected in fluid communication with an inner end of the third microfluidic channel, the first microfluidic channel having a first width and a first depth;

the second microfluidic channel having a first end connected in fluid communication with an outer end of the third microfluidic channel and a second end adapted to communicate with a vent of the self-powered microfluidic circuit, the second microfluidic channel having a second width over a section of the second microfluidic channel between the first and second ends thereof, the second width of the section of the second microfluidic channel at least partially defining a predetermined retention pressure for the self-powered microfluidic device;

the third microfluidic channel interconnecting the first and second microfluidic channels and having a third width, a third length and a third depth, the third width being greater than the first width of the first microfluidic channel and less than the second width of the portion of the second microfluidic channel;

a cover over the first, second, and third microfluidic channels, the cover comprising a hydrophobic coating on a predetermined region of the cover adjacent the first, second, and third microfluidic channels, the predetermined region comprising at least where the third microfluidic channel intersects the first microfluidic channel; and wherein the fluid fed into the first microfluidic channel flows by capillary action into the second and third microfluidic channels and is retained therein until a pressure within the first microfluidic channel generated by the capillary pump via the main fluid channel exceeds the predetermined retention pressure, and when the pressure within the first microfluidic channel exceeds the predetermined retention pressure the fluid is burst released out of the first end of the second microfluidic channel, through the third microfluidic channel, and into the first microfluidic channel for draining back into the main fluid channel of the self-powered microfluidic circuit, thereby draining the fluid from the first, second, and third microfluidic channels simultaneously without the fluid being trapped within the third microfluidic channel.

17. The microfluidic device of claim 16, wherein the vent of the self-powered microfluidic circuit is open to atmosphere.

18. The microfluidic device of claim 16, wherein the second microfluidic channel includes a tapering portion having a tapering width along a length of the tapering portion at the first end of the second microfluidic channel, the tapering portion extending between the section of the second microfluidic channel and the third microfluidic channel to provide a fluidicly smooth transition therebetween.

19. The microfluidic device of claim 16, wherein a transition between the third width of the third microfluidic channel and the first width of the first microfluidic channel is fluidicly abrupt.

20. The microfluidic device of claim 16, wherein the second width of the second microfluidic channel is greater than the first width of the first microfluidic channel, and at least one of the third width and the third depth of the third microfluidic channel is greater than the first width and the first depth, respectively, of the first microfluidic channel.

21. The microfluidic device of claim 16, wherein the dimensions of the first microfluidic channel define a first capillary pressure, the dimensions of the second microfluidic channel define a second capillary pressure, and the dimensions of the third microfluidic channel define a third capillary pressure, first capillary pressure being greater than the pump capillary pressure, the second capillary pressure being less than the pump capillary pressure, and the third capillary pressure being greater than the second capillary pressure.

\* \* \* \* \*